(12) United States Patent
Schwartz et al.

(10) Patent No.: US 12,142,047 B1
(45) Date of Patent: Nov. 12, 2024

(54) AUTOMATED AUDIO DESCRIPTION SYSTEM AND METHOD

(71) Applicant: 3Play Media, Inc., Boston, MA (US)

(72) Inventors: Andrew H. Schwartz, Boston, MA (US); Michael Chalson, Boston, MA (US); Nathanael Beisiegel, Boston, MA (US); Daniel J. Caddigan, Arlington, MA (US); Roger S. Zimmerman, Falmouth, MA (US); Christopher S. Antunes, Winchester, MA (US); Nicholas R. Moutis, Exeter, NH (US)

(73) Assignee: 3Play Media, Inc., Boston, MA (US)

( * ) Notice: Subject to any disclaimer, the term of this patent is extended or adjusted under 35 U.S.C. 154(b) by 0 days.

(21) Appl. No.: 18/680,449

(22) Filed: May 31, 2024

(51) Int. Cl.
G06V 20/40 (2022.01)
G06F 40/166 (2020.01)
G10L 13/02 (2013.01)
G11B 27/10 (2006.01)

(52) U.S. Cl.
CPC ............ G06V 20/47 (2022.01); G06F 40/166 (2020.01); G06V 20/41 (2022.01); G06V 20/49 (2022.01); G10L 13/02 (2013.01); G11B 27/10 (2013.01)

(58) Field of Classification Search
CPC ........ G06V 20/47; G06V 20/41; G06V 20/49; G06F 40/166; G10L 13/02; G11B 27/10
See application file for complete search history.

(56) References Cited

U.S. PATENT DOCUMENTS

| | | | |
|---|---|---|---|
| 10,726,289 B2 | 7/2020 | Kim et al. | |
| 10,949,744 B2 | 3/2021 | Lin et al. | |
| 11,244,111 B2 | 2/2022 | Lu et al. | |
| 11,281,709 B2 | 3/2022 | Zheng et al. | |
| 11,593,612 B2 | 2/2023 | Mao et al. | |
| 2020/0051582 A1 | 2/2020 | Gilson | |
| 2020/0204878 A1 | 6/2020 | Canton et al. | |
| 2021/0042579 A1 | 2/2021 | Chen et al. | |
| 2021/0125038 A1 | 4/2021 | Bengio et al. | |
| 2023/0259553 A1* | 8/2023 | Krishnamurthy | G06V 20/20 706/20 |

OTHER PUBLICATIONS

Jun Chen et al., Video ChatCaptioner: Towards Enriched Spatiotemporal Descriptions, King Abdullah University of Science and Technology, May 24, 2023.
AsticaVision—Image AI API, asticaVision Documentation—Computer Vision API, https://www.astica.org/api-docs/asticaVision/ retrieved Apr. 26, 2023.
AsticaVision—Image AI API, Describe Images—Computer Vision API, https://www.astica.org/vision/describe/ retrieved Apr. 26, 2023.

\* cited by examiner

*Primary Examiner* — Girumsew Wendmagegn
(74) *Attorney, Agent, or Firm* — Finch & Maloney PLLC

(57) ABSTRACT

An audio description system includes a memory and a processor. The memory stores source media comprising frames positioned within the source media according to a time index. The processor is configured to generate, using an image-to-text model, a textual description of each frame; identify intervals within the time index, each interval encompassing one or more positions of one or more frames; identify placement periods within the time index, each placement period being temporally proximal to an interval; generate a summary description based on at least one textual description of at least one frame positioned within a selected interval temporally proximal to a placement period; and associate the summary description with the placement period.

30 Claims, 21 Drawing Sheets

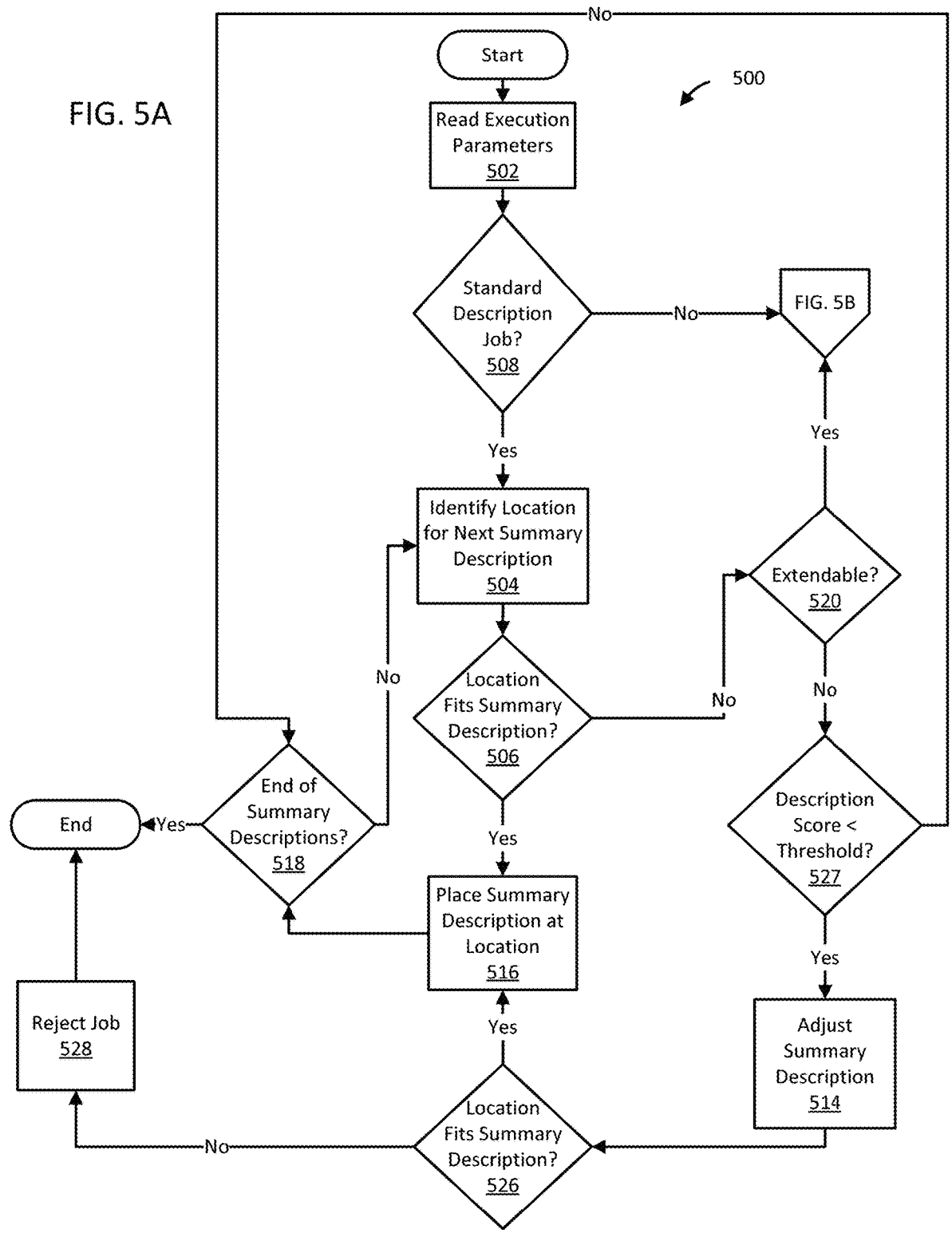

FIG. 14

AUTOMATED AUDIO DESCRIPTION SYSTEM AND METHOD

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

RELATED APPLICATIONS

The present application relates to U.S. Pat. No. 9,704,111, issued on Jul. 11, 2017 and titled "ELECTRONIC JOB MARKET" ("Electronic Job Market patent"), which is hereby incorporated herein by reference in its entirety. The present application relates to U.S. Pat. No. 9,633,696 issued on Apr. 25, 2017 and titled "SYSTEMS AND METHODS FOR AUTOMATICALLY SYNCHRONIZING MEDIA TO DERIVED CONTENT" ("Alignment patent"), which is hereby incorporated herein by reference in its entirety. The present application relates to U.S. Pat. No. 11,238,899 issued on Feb. 1, 2022 and titled "EFFICIENT AUDIO DESCRIPTION SYSTEMS AND METHODS" ("Audio Description patent"), which is hereby incorporated herein by reference in its entirety.

BACKGROUND

Technical Field

The technical field of this disclosure relates generally to audio description of content and, more particularly, to systems and methods that generate an automated audio description of content depicted in a media file.

Background Discussion

Audio description of video (sometimes referred to as "descriptive narration" or "video description") provides, through an audio track or channel, critical information about actions, characters, scene changes, on-screen text, and other visual content that is not articulated in the video's source audio. Audio description improves the accessibility of visual images for people who are blind, low vision, or are otherwise visually impaired. Several U.S. federal accessibility laws require audio description for video in certain contexts, including for when video is presented on-line.

However, the creation of audio description is extremely expensive and cumbersome. Traditionally, producers of video content have employed script writers and voice talent to create audio descriptions. In this traditional approach, the time points for insertion of the descriptions are determined interactively while watching the video content, the script for the descriptive audio is created given an estimate of how much speech can fit in the available time, and the human voice is recorded iteratively to carefully fit into the indicated time limitations. Often, this process must be repeated many times to optimize the usefulness of description given the time constraints.

Accordingly, systems have been developed to address these difficult timing constraints as well as the shortage of qualified voice talent. An example of such a system is disclosed in the Audio Description patent. However, these systems do not alleviate the need for skilled script writers to create the descriptive text. The script writing component requires skill and interpretation to create audio descriptions which best describe the video while not interfering with the original audio track or overloading the consumer with too much detail. Choosing the correct placement (in time), content and phrasing for the descriptive text is challenging and time-consuming.

SUMMARY

In at least one example, an audio description system is provided. The system includes a memory and at least one processor coupled with the memory. The memory stores source media comprising a plurality of frames positioned within the source media according to a time index. The at least one processor is configured to generate, using an image-to-text model, a textual description of each frame of the plurality of frames; identify a plurality of intervals within the time index, each interval of the plurality of intervals encompassing one or more positions of one or more frames of the plurality of frames; identify a plurality of placement periods within the time index, each placement period of the plurality of placement periods being temporally proximal to an interval of the plurality of intervals; generate a summary description based on at least one textual description of at least one frame positioned within a selected interval temporally proximal to a placement period of the plurality of placement periods; and associate the summary description with the placement period.

Examples of the system may include one or more of the following features.

In the system, each interval of the plurality of intervals may be defined by points on the time index associated with a cluster of textual descriptions or a segment of the source media. The cluster of textual descriptions may be associated with the points on the time index via frames described by the textual descriptions. To identify the plurality of intervals may include to identify locations in the source media using at least one modality. To identify the plurality of placement periods may include to identify locations in the source media using the at least one modality. The at least one modality may include one or more of an encoding data modality, an image data modality, an audio data modality, or a transcription data modality. Each interval of the plurality of intervals may encompass a temporally proximal set of frames depicting visually similar content that is dissimilar from content depicted in frames outside the interval. The textual descriptions of the set of frames depicting visually similar content may share a common topic. The temporally proximal set of frames are positioned within a span of the time index with a duration of between 5 seconds and 30 seconds. A parameter specifying the duration may be user configurable.

In the system, each placement period of the plurality of placement periods temporally proximal to an interval may be positioned within 3 seconds of the interval according to the time index. A parameter specifying temporal proximity may be user configurable. The at least one processor may be further configured to receive user input specifying an an adjustment to the placement period; and record the adjustment to the placement period, thereby repositioning the placement period relative to the interval. To generate a summary description based on at least one textual description may include to identify a textual description that is representative of a cluster of textual descriptions. To generate a summary description based on at least one textual description may include to prompt a large language model (LLM) to summarize a plurality of textual descriptions generated by the image-to-text model. To generate a summary description based on at least one textual description may include to prompt an LLM to summarize a plurality of textual descriptions generated by orchestrated interoperations between another LLM and the image-to-text model. The at least one processor may be further configured to generate audio description data based on an association between the summary description and the placement period.

In at least one example, a method is provided. The method includes generating, using an image-to-text model, a textual description of each frame of a plurality of frames positioned within source media by a time index; identifying a plurality of intervals within the time index, each interval of the plurality of intervals encompassing one or more positions of one or more frames of the plurality of frames; identifying a plurality of placement periods within the time index, each placement period of the plurality of placement periods being temporally proximal to an interval of the plurality of intervals; generating a summary description based on at least one textual description of at least one frame positioned within a selected interval temporally proximal to a placement period of the plurality of placement periods; and associating the summary description with the placement period.

Examples of the method may include one or more of the following features.

In the method, identifying the plurality of intervals may include identifying locations in the source media using at least one modality. Identifying the plurality of placement periods may include identifying locations in the source media using the at least one modality. Identifying locations in the source media using the at least one modality may include identifying locations in the source media using one or more of an encoding data modality, an image data modality, an audio data modality, or a transcription data modality. Identifying the plurality of intervals may include identifying a segment of the source media. Identifying the plurality of intervals comprises identifying a cluster of textual descriptions of a temporally proximal set of frames depicting visually similar content that is dissimilar from content depicted in frames outside set of frames. Identifying the cluster of textual descriptions comprises identifying textual descriptions that share a common topic. Identifying the cluster of textual descriptions comprises identifying textual descriptions that are positioned within a span of the time index with a duration of between 5 seconds and 30 seconds. The method may further include receiving user input specifying the duration.

In the method, identifying the plurality of placement periods may include identifying placement periods that are positioned within 3 seconds of intervals of the plurality of intervals. The method may further include receiving user input specifying temporal proximity. The method may further include receiving user input specifying an an adjustment to the placement period; and recording the adjustment to the placement period, thereby repositioning the placement period relative to the interval. In the method, generating a summary description based on at least one textual description may include identifying a textual description that is representative of a cluster of textual descriptions. Generating a summary description based on at least one textual description may include prompting a large language model (LLM) to summarize a plurality of textual descriptions generated by the image-to-text model. Generating a summary description based on at least one textual description may include prompting an LLM to summarize a plurality of textual descriptions generated by orchestrated interoperations between another LLM and the image-to-text model. The method may further include generating audio description data based on an association between the summary description and the placement period.

In at least one example, one or more non-transitory computer readable media are provided. The media store sequences of instructions executable by a processor to autonomously generate audio description from source media. The sequences of instructions include instructions to generate, using an image-to-text model, a textual description of each frame of a plurality of frames positioned within the source media by a time index; identify a plurality of intervals within the time index, each interval of the plurality of intervals encompassing one or more positions of one or more frames of the plurality of frames; identify a plurality of placement periods within the time index, each placement period of the plurality of placement periods being temporally proximal to an interval of the plurality of intervals; generate a summary description based on at least one textual description of at least one frame positioned within a selected interval temporally proximal to a placement period of the plurality of placement periods; and associate the summary description with the placement period.

Examples of the media may include one or more of the following features.

In the media, the instructions to identify the plurality of intervals may include instructions to identify locations in the source media using at least one modality. The instructions to identify the plurality of placement periods may include instructions to identify locations in the source media using the at least one modality. The instructions to identify locations in the source media using the at least one modality may include instructions to identify locations in the source media using one or more of an encoding data modality, an image data modality, an audio data modality, or a transcription data modality. The instructions to identify the plurality of intervals may include instructions to identify a segment of the source media. The instructions to identify the plurality of intervals may include instructions to identify a cluster of textual descriptions of a temporally proximal set of frames depicting visually similar content that is dissimilar from content depicted in frames outside set of frames. The instructions to identify the cluster of textual descriptions may include instructions to identify textual descriptions that share a common topic. The instructions to identify the cluster of textual descriptions may include instructions to identify textual descriptions that are positioned within a span of the time index with a duration of between 5 seconds and 30 seconds. The sequences of instructions further include instructions to receive user input specifying the duration.

In the media, the instructions to identify the plurality of placement periods may include instructions to identify placement periods that are positioned within 3 seconds of intervals of the plurality of intervals. The sequences of instructions may further include instructions to receive user input specifying temporal proximity. The sequences of instructions may further include instructions to receive user input specifying an an adjustment to the placement period; and record the adjustment to the placement period, thereby repositioning the placement period relative to the interval.

The instructions to generate a summary description based on at least one textual description may include to instructions to identify a textual description that is representative of a cluster of textual descriptions. The instructions to generate a summary description based on at least one textual description may include instructions to prompt a large language model (LLM) to summarize a plurality of textual descriptions generated by the image-to-text model. The instructions to generate a summary description based on at least one textual description may include the instructions to prompt an LLM to summarize a plurality of textual descriptions generated by orchestrated interoperations between another LLM and the image-to-text model. The sequences of instructions may further include instructions to generate audio description data based on an association between the summary description and the placement period. The instructions to generate the textual description may include instructions to generate a textual description of a portion of a frame of the plurality of frames.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure.

FIGS. 5A and 5B are a flow diagram illustrating a process of generating an audio description according to at least one embodiment described herein.

FIG. 14 is a front view of another example describing screen according to at least one embodiment described herein.

DETAILED DESCRIPTION

Figure 1:
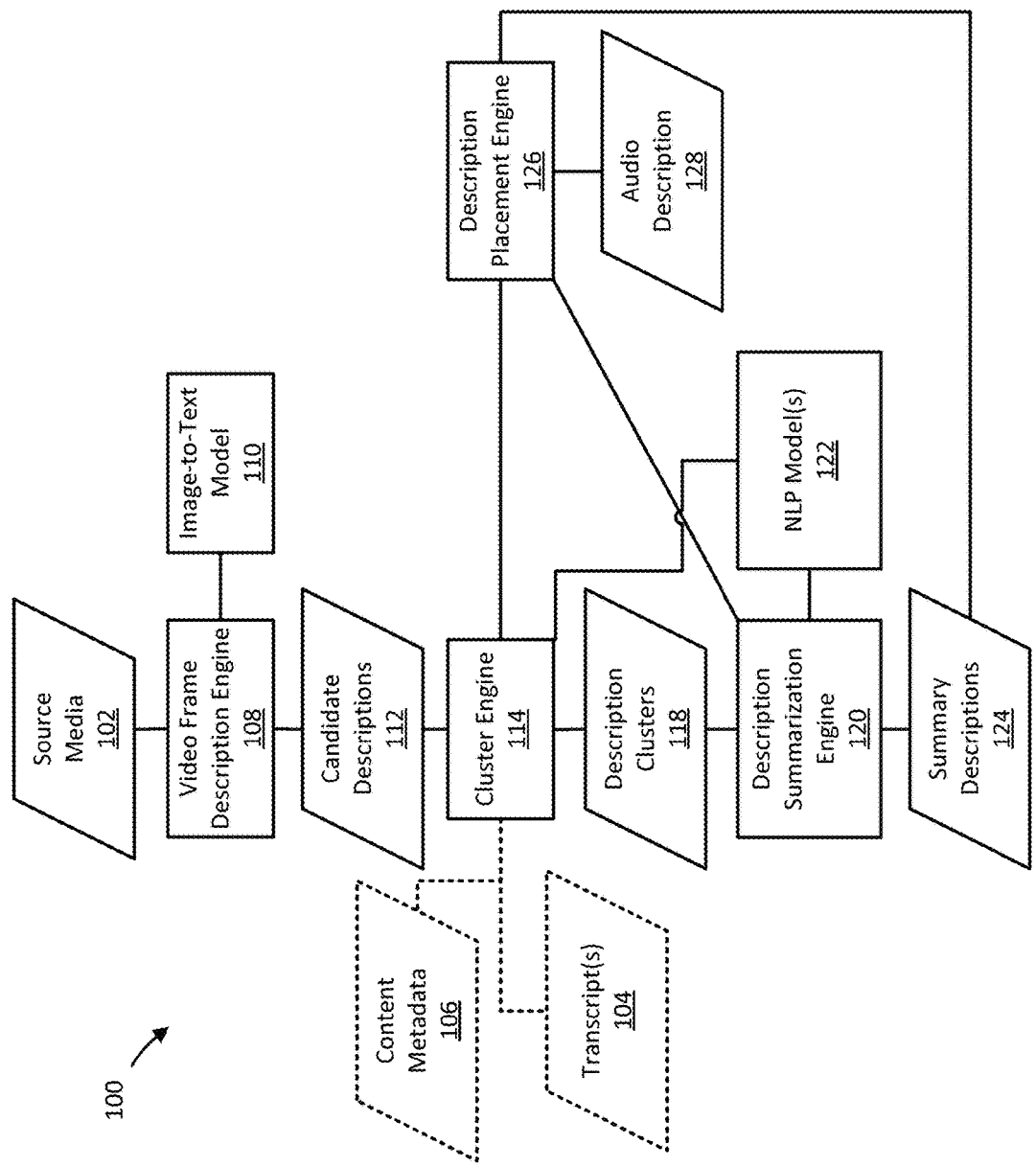
FIG. 1 is a block diagram of an architecture implemented within an audio description system according to at least one embodiment described herein.

At least one embodiment disclosed herein includes apparatus and processes for implementing, using a computer system, an audio description system. In some embodiments, the audio description system receives requests (e.g., electronic messages) to perform audio descriptions from computers operated by customers. These audio description requests may identify and/or include media files with encoded video content that the customers seek to have audibly described during playback. The audio description requests may also include a transcript of the media file and/or a request to transcribe the media file.

The embodiments disclosed herein effectively use automated methods of generating text descriptions from images in a system that can produce an accurate audio description of source media, such as video content. Some embodiments are suitable for longer form content and address the challenges described above in both generating and timing relevant audio descriptions. Particularized embodiments disclosed herein include a fully automated system that utilizes over-generation and pruning to produce relevant audio descriptions, a hybrid human-automated system that generates a complete draft of an audio description document to be modified by a human editor, and an on-demand tool used by human editors to generate and modify description text at selected times in a media file. The features described in each of these particularized embodiments, and other embodiments described herein, may be reorganized and intermingled, in various examples.

In some embodiments, the audio description system includes components of, or is interfaced to and interoperates with, a job market as implemented by the transcription system 100 described in the Electronic Job Market patent. In these embodiments, the audio description system initiates execution of components of the job market to manage the creation of a transcript of the media file, where a transcription request was included in the audio description request and/or where no transcript was provided as part of the audio description request. Available transcripts may be used with the associated media files as inputs to audio description processes. For instance, a transcript may be used by the audio description system to identify portions of the media file suitable for overlay with audio description and/or to determine the overall suitability of the media file for audio description.

Further, in some embodiments, the audio description system utilizes components described in the Electronic Job Market patent to manage creation of the audio description. For instance, in some embodiments, the audio description system creates and posts audio description jobs associated with the media files. These audio description jobs may be completed by audio description professionals (referred to herein as "describers") who access the audio description system via a user interface, such as a describer user interface described further below. In some embodiments, these features and other features of the audio description system described herein are implemented via execution of a description engine and/or a describer interface, as described further below.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Audio Description System

Figure 12:
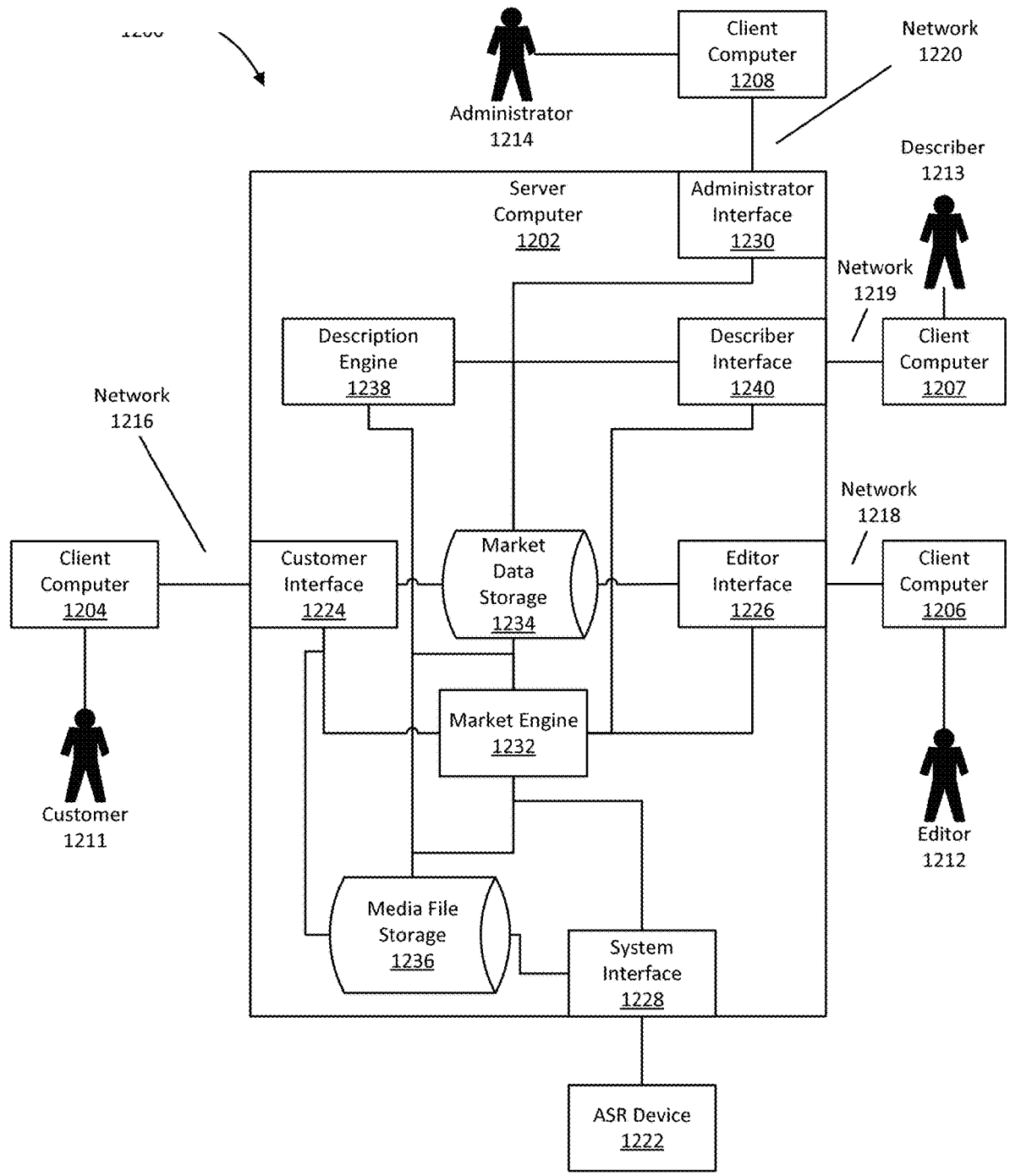
FIG. 12 is a context diagram including one example of an audio description system according to at least one embodiment described herein.

Various embodiments implement an audio description system configured to generate and/or support audio description of a media file using one or more computer systems. FIG. 12 illustrates one of these embodiments, an audio description system 1200. As shown, FIG. 12 illustrates a server computer 1202; client computers 1204, 1206, 1207, and 1208; a customer 1211; an editor 1212; a describer 1213; an administrator 1214; networks 1216, 1218, 1219, and 1220; and an automatic speech recognition (ASR) device 1222. The server computer 1202 includes several components: a customer interface 1224, an editor interface 1226, a system interface 1228, an administrator interface 1230, a market engine 1232, a market data storage 1234, a media file storage 1236, a description engine 1238, and a describer interface 1240.

In certain examples, individual features of the audio description system 1200 are capable of executing processes that are executed by corresponding features of the audio system 100 described in the Audio Description patent. For instance, in some examples, the description engine 1238 is configured to execute the processes executed by the description engine 138 described in the Audio Description patent. In addition, the features of the audio description system 1200 described herein may be enhanced and configured to execute additional processes as described below. In the event of inconsistencies between descriptions of the features of the audio description system 1200 described in this specification and the audio description system 100 described in the Audio Description patent, the feature description in the Audio Description patent is supplementary to that in this specification; for irreconcilable inconsistencies, the feature description in this specification controls.

One goal of the audio description system 1200 is to receive media files from customers and to provide final, high quality audio descriptions of the content included in the media files to the customers. According to various embodiments, the description engine 1238 is configured to execute a variety of processes to develop audio descriptions associated with media files within the audio description system 1200.

In some embodiments, the description system 1200 receives an audio description request and a media file via an upload from a customer interface, such as the customer interface 1224, or as a result of a previously received media file being split by operation of the market engine 1232. The upload from a customer interface may also include a transcription file storing transcription data representing the transcript. This transcription file may be time-coded or not time-coded. Time-coded transcription files identify time locations for words and other important sounds throughout the media file. In other embodiments, the upload may include a transcription request as an addition to, or alternative of, a transcription file. The customer interface is configured to store any received media files in the file storage 1236. Further, in some examples, the customer interface is configured to pass the audio description request to the engine 1238 for subsequent processing.

In some embodiments, in response to reception of the request for audio description, the description engine 1238 retrieves the media file from the media file storage 1236 and processes the media file using an audio description architecture, such as the audio description architecture 100 illustrated in FIG. 1. Processing executed via the architecture 100 generates final audio descriptions, in some examples. As shown in FIG. 1, the architecture 100 includes a video frame description engine 108, a cluster engine 114, an image-to-text (ITT) model 110, a description placement engine 126, a description summarization engine 120, and one or more natural language processing (NLP) models 122. When implementing the architecture 100 in some examples, the description engine 1238 exchanges information with the describer interface 1240, the media file storage 1236, and the market data storage 1234 of FIG. 12.

In some embodiments, the engine 108 is configured to interoperate with the model 110 to generate descriptions of images stored within source media 102. In situations where one or more entire media files are targeted for audio description (e.g., where the engine 1238 receives a request from a market engine, such as the market engine 1232 of FIG. 12), the source media 102 may include the one or more media files from a media file data store, such as media file storage 1236 described below with reference to FIG. 12, and may have a time index that organizes (e.g., positions) frames (e.g., video frames) within the source media. In situations where only a portion of a media file is targeted for audio description (e.g., where the engine 1238 receives a request from a describer interface, such as the describer interface 1240 of FIG. 12), the source media 102 may include only the targeted portion. Such requests may include requests for audio description creation and/or identification of locations (e.g., one or more points in time, such as identified by timestamps within the time index) suitable for inserting audio description. Such locations may include, for example, gaps (e.g., periods of silence, etc.) within the source media.

Figure 2:
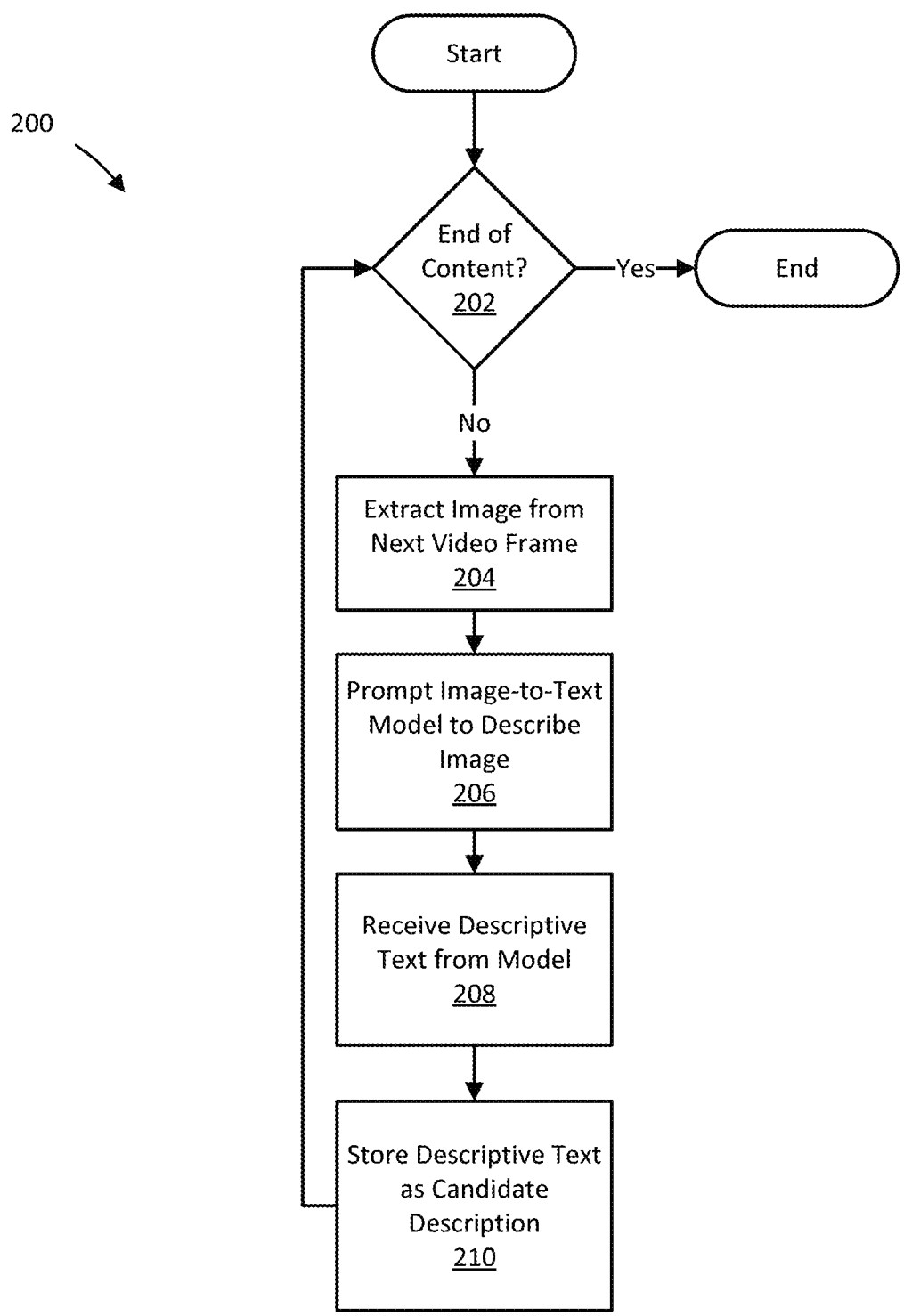
FIG. 2 is a flow diagram illustrating a process of generating candidate descriptions according to at least one embodiment described herein.

In some embodiments, the ITT model 110 is configured to generate a candidate description 112 for each processed frame. Each candidate description 112 may be a textual description of the content of the frame. Thus, each frame may be associated with a respective candidate description 112. The ITT model 110 may include one or more of a Bootstrapping Language-Image Pre-training (BLIP) model, a BLIP-2 model, a Large Language and Vision Assistant (LLaVA) model, Loops, Markopolo AI, AdQuick, or any combinations of these models. Other current and/or future models capable of generating textual descriptions of images may be used in certain examples. These models may be pre-trained and fine-tuned and/or trained from scratch, depending on the implementation. FIG. 2 illustrates an example process 200 that the engine 108 is configured to execute according to some embodiments of the present disclosure.

As shown in FIG. 2, the process 200 starts in act 202 with the engine 108 determining whether the end of the media file has been reached. If so, the process 200 ends. Otherwise, the engine 108 executes act 204.

In the act 204, the engine 108 extracts an image from a frame of source media (e.g., the source media 102 of FIG. 1) not yet processed by this instance of the process 200. The unprocessed frame selected for image extraction may be the next sequential frame within the medial file or may be a frame selected according to a sampling rate. For instance, in some embodiments, the engine 108 selects an unprocessed frame from which to extract an image in every Nth frame, where N may equal 2, 4, 7, 10, or some other number. The particular value of N may be determined, for example, based on the frame rate of the source media.

In alternative embodiments, the frame description engine 108 adjusts the frame sampling rate based on an amount of change in content stored within the source media. For example, the engine 108 may increase the frame sampling rate near locations within the source media where video compression frames from a compressed version of the source media and/or text metadata from a transcript of the source media (e.g., the transcript 104 of FIG. 1) indicate a change in content. A change in content can include, but is not limited to, the start or end of an action sequence, a change between scenes, an abrupt physical movement from a character, etc.

In act 206, the engine 108 communicates a prompt to the ITT model 110. The prompt may include a human language request to describe the image. The engine 108 can execute one or more application programming interface (API) calls to communicate the prompt to the ITT model 110. The engine 108 can also receive, in response to the API calls, strings of description text for the corresponding image.

In the act 208, the engine 108 receives the description text from the ITT model 110. For instance, in some examples, the engine 108 receives a response to an API call and parses the response to extract the description text.

In the act 210, the engine 108 stores the description text as a candidate description 112 for subsequent processing. The engine 108 can store an association between the description text and the image the text describes. When the engine 108 stores the candidate description 112, the process 200 loops to the act 202 to determine whether the engine 108 has reached the end of the source media.

Figure 3:
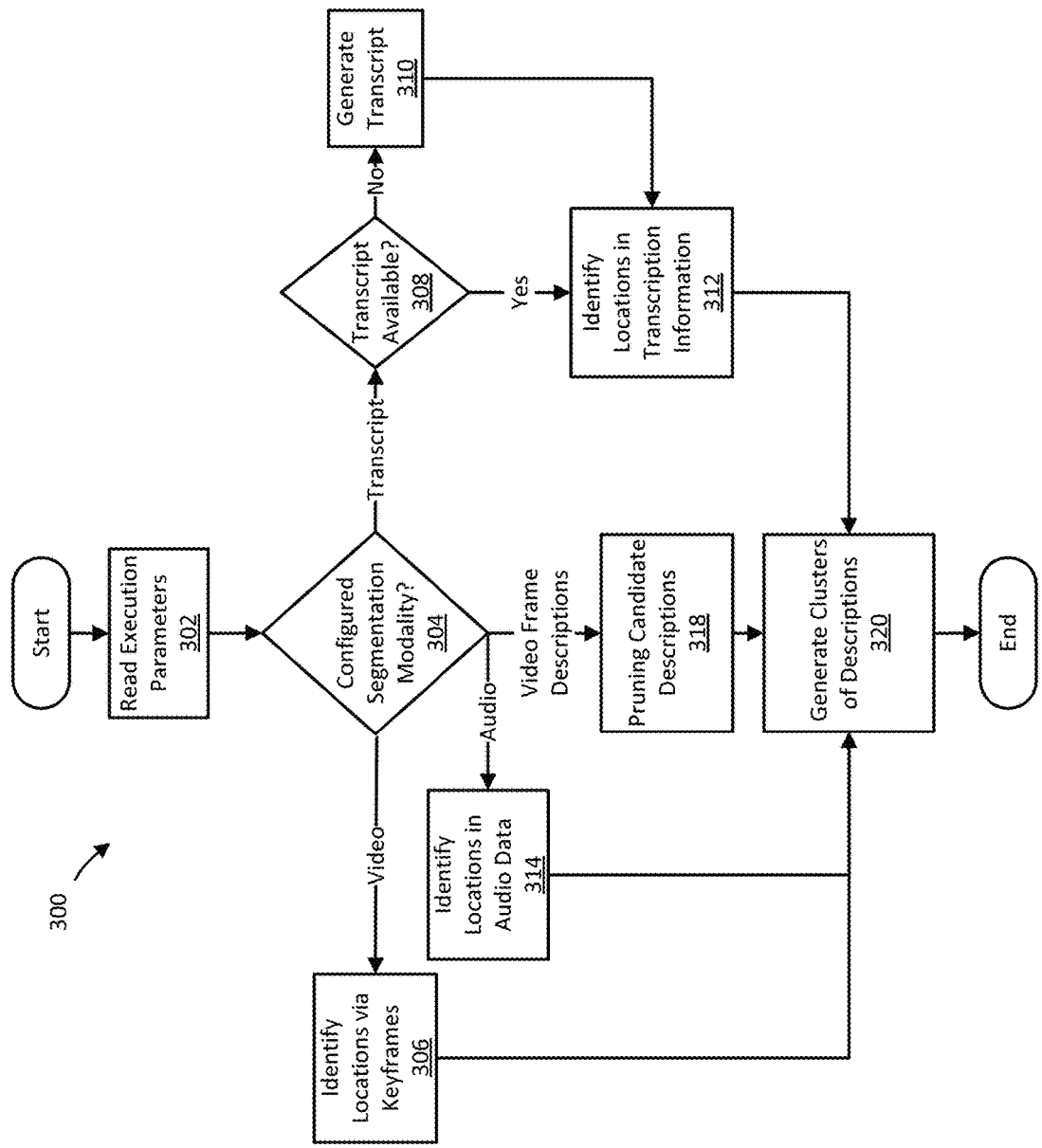
FIG. 3 is a flow diagram illustrating a process of generating clusters of descriptions according to at least one embodiment described herein.

Returning to FIG. 1, in some embodiments, the engine 108 is configured to communicate, upon completion of the process 200 of FIG. 2, a message indicating the availability of the candidate descriptions 112 to the cluster engine 114. In some embodiments, the engine 114 is configured to identify clusters within the candidate descriptions 112 and to select particular clusters for which to generate audio descriptions. FIG. 3 illustrates an example process 300 that the cluster engine 114 is configured to execute. In some examples, the cluster engine 114 is configured to retrieve metadata descriptive of source media and content depicted therein (e.g., the content metadata 106 of FIG. 1) from a data store (e.g., the media file storage 1236 of FIG. 12). This content metadata may include, for example, names of entities depicted in the source media. The cluster engine 114 may be further configured to retrieve transcription information (e.g., the transcript 104 of FIG. 1). This transcription information may include a time-coded textual representation of audio contained within the source media. The transcription information may be generated via operation of a transcription marketplace, as illustrated and described herein with reference to FIG. 12, or otherwise obtained via operation of a client interface, such as the customer interface 1224 described herein with reference to FIG. 12. In some examples, the customer interface 1224 is configured to provide other configuration screens to enable a customer to configure other audio description settings. One example of a configuration screen 1500 provided by the customer interface 1224 that affects execution of the engine 1238 and, in particular, the engine 114 is illustrated with reference to FIG. 15. As shown, the configuration screen 1500 includes controls 1502 configured to receive selections of audio description type, controls 1504 configured to receive values of tunable parameters of the description engine 1238 directed to identification/detection of locations suitable for placement of audio description data, and controls 1508 configured to receive values of tunable parameters of the description engine 1238 directed to determining overall media file suitability for audio description. The controls 1502, 1504, and 1508 impact how and whether audio description may be applied to original media files.

Returning to FIG. 3, the process 300 starts in act 302 with the cluster engine 114 reading execution parameters. The execution parameters include, in some examples, one or more of one or more identifiers of one or more segmentation modalities to be used in the process 300, an identifier of a clustering process for use in operation 320, and values specified by the controls 1504 regarding identification of audio description locations for use in operations 306, 314, and 312.

In some embodiments, the processes for determining whether sufficient time exists within the original audio track for standard audio description depend on a set of tunable parameters of the cluster engine 114. These tunable parameters are used by the cluster engine 114 to identify one or more portions of original audio data with attributes that meet one or more predefined criteria. The tunable parameters may include configurable threshold values related to insertion into audio description locations, of individual, distinct instances of audio description data and/or of all audio description data.

Some of the tunable parameters are used by the cluster engine 114 to identify locations in the original audio data of the source media. These locations are portions of original audio data suitable for concurrently and audibly rendered audio description. For instance, in one embodiment, the set of tunable parameters includes a value that specifies a maximum volume for suitable portions of original audio data. Portions of original audio data with a volume that exceeds the maximum volume value are identified as being unsuitable for concurrent rendering with audio description. The maximum volume value may be, for example, an absolute value (e.g., 0 dBm, 30 dBm, etc.) or a relative value calculated based on an average volume level of the entire file (e.g., the average volume level—20 decibels).

In another embodiment, the set of tunable parameters includes a value that specifies a maximum volume within particular frequency bands (e.g., in the 300-3000 KHz region where speech is predominant) for suitable portions of original audio data. Original audio data with frequencies outside of the particular frequency bands may contain background noise, music, or other audio not important for understanding the media file content and which are, therefore, potentially suitable. Portions of original audio data with a volume within the frequency bands that exceeds this maximum frequency band volume value are identified as being unsuitable for concurrent rendering with audio description. The maximum frequency band volume value may be, for example, an absolute value (e.g., 0 dBm, 30 dBm, etc.) or a relative value calculated based on an average volume level of the entire file (e.g., the average volume level—20 decibels).

In another embodiment, the set of tunable parameters includes a confidence value that specifies a minimum confidence required for a classifier to classify a portion of original audio data as including speech. Portions of original audio data for which the classifier returns a confidence above this minimum confidence value are identified as being unsuitable for concurrent rendering with audio description. The minimum confidence value may be, for example, 80%. The classifier may be, for example, an automated sound-event classification system such as described in Robust Sound Event Classification Using Deep Neural Networks (IEEE/ACM Transactions on Audio, Speech, and Language Processing, Vol. 23, No. 3, March 2015), which is hereby incorporated herein by reference in its entirety.

In another embodiment, the set of tunable parameters includes a value that specifies a minimum duration for suitable portions of original audio data. Portions of original audio data that are otherwise suitable, but that have a duration that falls below the minimum duration value are identified as being unsuitable for concurrent rendering with audio description. This minimum duration value may be, for example, 2 seconds. In some embodiments, the description engine 1238 is configured to reject any standard audio description orders for media files without sufficient time for description.

In another embodiment, the set of tunable parameters includes a Boolean value that indicates whether portions of the original audio data should be identified by processing the original audio data or a time-coded transcript of the original audio data. Where the Boolean value indicates that the original audio data should be processed, the cluster engine 114 is configured to use one or more values of the one or more tunable parameters described above to identify locations in the original audio data. But, where the Boolean value indicates that the time-coded transcript should be processed, the cluster engine 114 is configured to identify locations where a duration between transcript tokens exceeds the minimum duration value. It is appreciated that the time-coded transcript may be an ASR generated transcript, an edited transcript, or a QA completed transcript.

In another embodiment, the set of tunable parameters includes a Boolean value that indicates whether portions of the original video data should be analyzed to identify locations in the original audio data. Where the Boolean value indicates that the original video data should be analyzed, the cluster engine 114 is configured to execute a video processing technique (e.g., a text detection process) that identifies whether the video includes visible text. Where text is present, the cluster engine 114 identifies a location and, in some embodiments, generates and stores audio description text that matches the text detected in the video data.

Other tunable parameters are used by the cluster engine 114 to make an overall determination as to whether the media file is suitable for standard audio description. For instance, in one embodiment, the set of tunable parameters includes a value that specifies a minimum total number of locations required for a media file to be identified as suitable for standard audio description. Media files with locations that sum to less than the minimum number value are identified as unsuitable for audio description. The value of the minimum number of suitable portions may be, for example, 5 distinct portions or 1 distinct portion per minute of audibly rendered original audio data.

In another embodiment, the set of tunable parameters includes a value that specifies a minimum total duration of locations that is required for a media file to be identified as suitable for standard audio description. Media files in which a sum of location durations is less than the minimum total duration are identified as unsuitable for audio description. The value of the minimum total duration may be, for example, 30 seconds or 10 seconds per minute of audibly rendered original audio data.

It should be noted that the tunable parameters described above (and all other constants, variables, and thresholds described herein) may be configurable either via the administrative interface 1230 or via the customer interface 1224 of FIG. 12.

With continued reference to FIG. 3, in act 304, the engine 114 enumerates one or more modalities to be used to find locations suitable for placement of audio description and/or boundaries of clusters within the source media. These modalities may be identified within execution parameters, such as those parameters read in the operation 302.

If the one or more modalities include analysis of video encoding data, in act 306 the engine 114 identifies locations in the source media via an video encoded version of the source media. For instance, in some examples, the engine 114 inspects the video encoded version for one or more statistical features that indicate locations in the source media suitable for placement of audio description and/or boundaries of clusters. Examples of such features include keyframes.

In some embodiments, when processing keyframes, the cluster engine 114 loads tunable parameters and uses values of the tunable parameters to identify locations. Further, within the act 306, the engine 114 records positions (e.g., timestamps) within the source media of the statistical features to earmark location boundaries and duration.

If the one or more modalities include analysis of the audio data, in act 314 the engine 114 identifies locations in audio data obtained from the source media. For instance, in some examples, the engine 114 scans the audio data for periods of silence (e.g., complete silence and/or low audio volume relative to the source media audio). In certain examples, periods of silence indicate locations in the source media suitable for placement of audio description and/or boundaries of clusters. In some embodiments, when processing audio, the cluster engine 114 loads tunable parameters and uses values of the tunable parameters to identify locations. Further, within the act 314, the engine 114 records positions (e.g., timestamps) within the source media to mark location boundaries and duration.

If the one or more modalities include analysis of transcription data, in act 308 the engine 114 determines whether a transcript of the source media is available. For instance, in some examples, the engine 114 queries a data store, such as the media file storage 1236 of FIG. 12, for metadata associated with the source media that specifies a reference to a transcript. If the engine 114 determines that a transcript of the source media is available, the engine 114 proceeds to act 312. If the engine 114 determines that a transcript of the source media is not available, the engine proceeds to act 310.

In act 310, the engine 114 initiates generation of a time-coded transcript of the source media. The act 310 may include a variety of processes, according to various embodiments. For example, in one embodiment, the audio description system generates an ASR transcript of the media file via a system interface (e.g., the system interface 1228) to an ASR device (e.g., the ASR device 1222). In another embodiment, the audio description system creates a transcription job, posts the transcription job, and manages the transcription job to completion using a transcription generation process, such as the process 800 described in the Electronic Job Market patent. In another embodiment, the audio description system generates a time-coded transcript by importing one or more caption files (with or without audio description data) using, for example, 3Play Media's caption import service as described in the Alignment patent. Alternatively or additionally, where the customer uploads a non-time-coded transcript, the audio description system may generate a time-coded transcript from the non-time-coded transcript and the media file using an alignment process (e.g., 3Play Media's Transcription Alignment service). In all of these embodiments, including the embodiment where the time-coded transcript is produced using the full transcription process (potentially, including QA review) described in the Electronic Transcription Job Market application, in act 312, the time-coded transcript gives a full representation of metadata such as the time location and durational extent of all words and silence regions in the original media file. Additionally, the time-coded transcript may indicate metadata such as the durational extent of non-verbal events such as important background noises, musical passages, or sound effects. The time-coded transcript may also indicate metadata such as the durational extent of speech which is not in the native language of the target audience (e.g., using a tag like [NON-ENGLISH SPEECH]). Locations of speaker changes, the speaker names, paragraph breaks, sentence breaks, and other metadata may also be encoded in the transcript data structure. This processing, in turn, generates a transcript for use by the engine 114 within act 312 and returns a reference to or copy of the transcript to the engine 114.

In act 312, the engine 114 identifies locations via transcription data included in the transcript. For instance, in some examples, the engine 114 applies one or more discriminative natural language processing NLP models within the NLP models 122, such as latent Dirichlet allocation (LDA) or Embedded Topic Modeling (ETM), that can quantify text document topics and be used to detect changes in these topics. In certain examples, topic changes may indicate locations in the source media suitable for placement of audio description and/or boundaries of clusters. Alternatively or additionally, in some examples, the engine 114 finds time locations and/or changes in speakers within the transcription data. In certain examples, time locations and/or changes in speakers may indicate locations in the source media suitable for placement of audio description and/or boundaries of clusters. In some embodiments, when processing transcription information, the cluster engine 114 loads tunable parameters and uses values of the tunable parameters to identify locations. Further, within the act 312, the engine 114 records positions (e.g., timestamps) within the source media to earmark location boundaries and duration.

It is appreciated that identification of locations and/or determination of locations 306, 314, and 312 suitability for audio description can be made prior to any transcription processing by a describer. For example, locations can be identified and suitability determined where a time-coded transcript is available to the cluster engine 114, and the cluster engine 114 is configured to process the time-coded transcript for these purposes. One example of a process for analyzing a transcript for locations follows. This example focuses on a portion of a transcript represented by the following data structure.

[{index: 0, word: "This," start_time: 2.0, end_time: 2.2},
{index: 1, word: "video," start_time: 2.2, end_time: 2.8},
{index: 2, word: "describes," start_time: 2.8, end_time: 3.3},
{index: 3, word: "how to," start_time: 3.3, end_time: 3.6},
{index: 4, word: "do," start_time: 3.7, end_time: 3.8},
{index: 5, word: "audio description.," start_time: 3.8, end_time: 4.5},
{index: 6, "[MUSIC]," start_time: 5.5, end_time: 7.2},
{index: 7, word: "Before," start_time: 7.9, end_time: 8.2},
{index: 8, word: "you," start_time: 8.2, end_time: 8.3},
{index: 9, word: "begin," start_time: 8.3, end_time: 8.6},
{index: 10, word: "watch this," start_time: 11.9, end_time: 12.5},
{index: 11, word: "demonstration," start_time: 12.5, end_time: 13.5},
{index: 12, word: "Now," start_time: 23.4, end_time: 23.5},
{index: 13, word: "let's," start_time: 23.5, end_time: 23.6},
{index: 14, word: "proceed," start_time: 23.6, end_time: 23.9},
{index: 15, word: "with the lesson," start_time: 23.9, end_time: 24.2},
{index: 16: word: ",", start_time: 24.2, end_time: 24.2, metadata: "<paragraph>"},
{index: 17, word: "This," start_time: 28.9, end_time: 29.0},
. . .
]

In this example, by subtracting the start_time of the subsequent entry from the end_time of the previous entry (or, in the case of the entry at index 0, by subtracting 0.0), the description engine 1238 identifies that intervals of greater than or equal to 2 seconds (for example) occur at the following locations:

A) Before index 0, from 0.0 to 2.0 (2.0 seconds)
B) Between index 9 and index 10, from 8.6 to 11.9 (3.3 seconds)
C) Between index 11 and index 12, from 13.5 to 23.4 (9.9 seconds)
D) Between index 15 (or, equivalently 16) and index 17, from 24.2 to 28.9 (4.7 seconds)

In some embodiments, the cluster engine 114 is configured to remove transcript tokens that do not represent speech (e.g., tags such as "[MUSIC]" or "[BACKGROUND NOISE]") from the transcript before locations are identified. In the above example, this would add another identified location, namely between index 5 and index 7, extending from 4.5 seconds to 7.9 seconds into the media file. Removing these non-speech tokens may be an additional transcription system configuration that is displayed to the customer, as described above. For example, some customers may not wish audio description to be superimposed on musical passages on playback. In this example, the [MUSIC] entry at index 6 would then remain and the additional description region would not be added.

In some embodiments, the cluster engine 114 is configured to identify locations only at grammatically salient locations, such as sentence boundaries or paragraph breaks. In these embodiments, a sentence-boundary restriction would eliminate location (B) above, since this occurs mid-sentence. Alternatively or additionally, if locations are only allowed at paragraph breaks, then only locations (A) and (D) would be identified (A because the beginning of the transcription is implicitly a paragraph break, and D because of the explicit break as indicated in the metadata at index 16).

In act 318, the engine 114 identifies and prunes redundant candidate descriptions 112. For instance, in some examples, the engine 114 uses an NLP model (e.g., one of the NLP models 122 of FIG. 1), simple word counting, and/or phrase embedding to detect descriptions that are within a configurable threshold measurement to one another to identify redundant candidate descriptions 112. Alternatively or additionally, the engine 114 may interoperate with and/or implement an NLP configured for semantic analysis (e.g., topic modeling, phrase embedding, etc.) to generate description vectors that reflect semantic content within each of the candidate descriptions 112. In certain embodiments, candidate descriptions 112 with redundant semantics are pruned. In other embodiments, the engine 114 arranges all of the vectors in chronological order of their associated candidate description 112 and compares each vector to its adjacent vector. The engine 114 visits each vector and prunes its associated candidate description 112 if the visited vector is the same as the next, adjacent vector.

In act 320, the engine 114 identifies clusters within the candidate descriptions 112 using a clustering process. The clustering process may be configurable and may include one or more of K-means, Gaussian Mixture Model, or the like. In some examples, the vectors generated in the act 318 are analyzed by the clustering process, although the engine 114 may generate other vector representations of the candidate descriptions 112. For instance, in some examples, the vector representation of each candidate description includes a member that quantifies a distance in frame representations and statistics, such as average pixel value differences between frames, differences in object tracking outputs, and so on, between a keyframe within a compressed version of the source media and the image described by the candidate description. Alternatively or additionally, in some examples, the vector representation of each candidate description includes a member that quantifies the image distance as well as temporal offset between the frame corresponding to the closest period of silence within audio of the source media and the image described by the candidate description. Alternatively or additionally, in some examples, the vector representation of each candidate description includes a member that quantifies an image and a temporal distance between the frame at a time at which a speaker depicted within the source media changes and the image described by the candidate description. Alternatively or additionally, in some examples, the vector representation of each candidate description includes a member that quantifies an image and a temporal distance between the frame at a time at which a speaker depicted within the source media enters or exits a scene and the image described by the candidate description. Alternatively or additionally, in some examples, the vector representation of each candidate description includes a member that quantifies an image and a temporal distance between the frame at a location in dialog within the source media and the image described by the candidate description. Other potential vector representations of candidate descriptions (e.g., those that quantify object detection and tracking, sum of pixel value differences, etc.) will be apparent. Upon completion of the clustering process, the engine 114 stores clusters of candidate descriptions 112 and, in some examples, their associated vectors within a data store (e.g., the description clusters 118 of FIG. 1) for subsequent processing.

In some embodiments, in the act 320 the engine 114 may refer to a configurable parameter that can bias within the clustering process toward more or fewer descriptions that are allowed within a cluster. Alternatively or additionally, the engine 114 may utilize a configurable refractory period (e.g., 5 seconds) after a cluster of candidate descriptions 112 is identified in the source media during which another cluster may not be identified. Alternatively or additionally, the engine 114 may utilize a surround-suppression filter to decrease the number of clusters identified within the candidate descriptions 112. Alternatively or additionally, the engine 114 may interoperate with a large language model (LLM) to prompt the LLM to identify clusters based on commonalities such as topic or other semantic attributes.

In some embodiments, in the act 320 the engine 114 may calculate a description importance score for each cluster and remove any cluster with a description importance score less than a threshold value. In some examples, the description importance score is a function of attributes of the cluster, such as but not limited to: proximity to a scene change as measured by scene detection models (FFmpeg, which is available via the FFmpPEG website, has such a filter provided with its distribution) and video key frames; topic change in dialog as measured by NLP topic modeling applied to the transcript; and retention of the candidate description when all descriptions are put through an NLP document summarization model. For instance, in one example, a description importance score is determined for each cluster by calculating a similarity between the topic or topics detected in the cluster and the topic or topics detected in the overall transcript. Other methods of calculating description importance scores will be apparent. Using the importance score to prune "less important" descriptions can allow the description clustering, described above, to retain the candidate descriptions that are more likely to be meaningful and relevant to rapidly changing content in the video.

Regardless of the identification method used, in some embodiments, each cluster of candidate descriptions is associated with an interval between endpoints on the time index of the source media. The position of the interval, and its association with between the interval and each cluster, may be established, for example, by the position of frames associated with candidate descriptions within the cluster.

Figure 4:
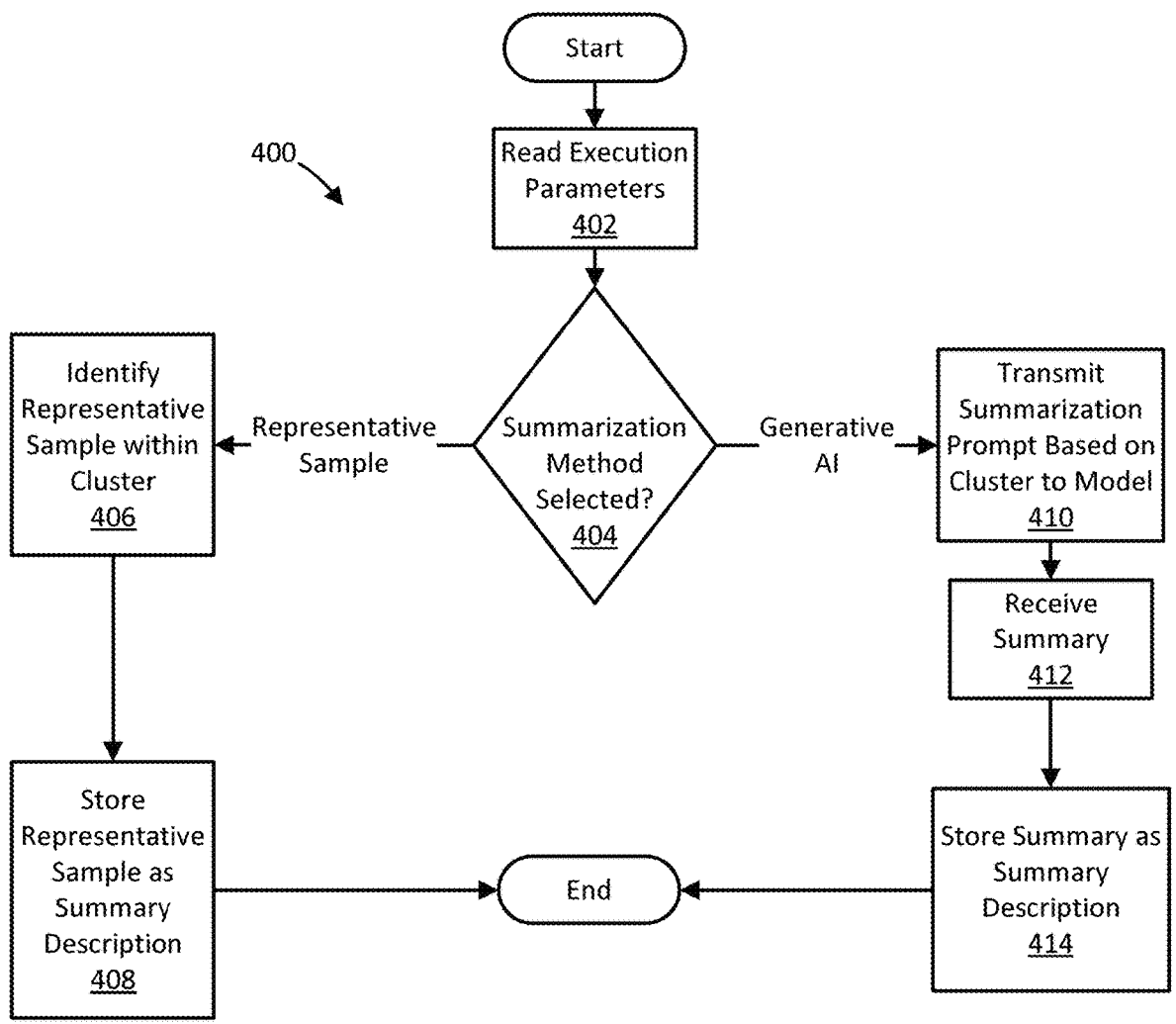
FIG. 4 is a flow diagram illustrating a process of generating summary descriptions according to at least one embodiment described herein.

Returning to FIG. 1, in some embodiments, the engine 114 is configured to communicate, upon completion of the process 300 of FIG. 3, a message indicating the availability of the description clusters 118 to the description summarization engine 120. In some embodiments, the engine 120 is configured to generate summary descriptions of the candidate descriptions 112 within each description cluster 118. FIG. 4 illustrates an example process 400 that the engine 120 is configured to execute in some examples.

As shown in FIG. 4, the process 400 starts in act 402 with the description summarization engine 120 reading execution parameters. The execution parameters include, in some examples, one or more of one or more identifiers of one or more summarization methods to be used to generate summary descriptions (e.g., the summary descriptions 124 of FIG. 1) from description clusters (e.g., the description clusters 118 of FIG. 1).

In act 404, the engine 120 identifies which summarization method to execute based on the execution parameters read in the act 402. If the execution parameters indicate that a representative sample method should be used, then the process 400 proceeds to act 406. However, if execution parameters indicate that a generative AI method should be used, then the process 400 proceeds to act 410.

In act 406, the engine 120 identifies a representative description to associate with each cluster. This processing may operate on the candidate descriptions within each cluster. In some embodiments, the engine 120 uses the centroid and description vectors used by the clustering process in act 320 of FIG. 3 to determine the representative samples. In these embodiments, the engine 120 compares the description vectors to the centroids to determine a candidate description 112 within each cluster with an associated vector nearest the centroid. Each candidate description 112 associated with a vector nearest a centroid is selected to be a representative sample.

In act 408, the engine 120 stores the representative samples as summary descriptions 124 of associated clusters. In some examples, the engine 120 communicates a message to the placement engine 126 that indicates the availability of the summary descriptions 124 for placement.

In alternative embodiments, in act 410, the engine 120 calls, via APIs, an NLP model (e.g., the NLP Model(s) 122) to generate a summary description (e.g., a summary description 124 of FIG. 1) of candidate descriptions within each description cluster (e.g., of the description clusters 118 of FIG. 1). For instance, in some embodiments, the engine 120 prompts the models 122 to perform summarization analysis on the candidates descriptions in each description cluster to generate a summary that best represents the candidate descriptions. The models 122 can identify a general sentiment within the description cluster, identify key words within each of the candidate descriptions in the description cluster, determine candidate description lengths, find the general topic of the description cluster, etc. and use these as inputs to generate a summary of the candidate descriptions in the description cluster. In some examples, the engine 120 includes transcription information temporally near (e.g., within 5 seconds before or 5 seconds after) the description cluster in the context passed to the NLP model to provide the NLP model additional context for the summary description. Once the summary description 124 has been generated, the candidate descriptions in the clustered description are pruned, and the summary is correlated with its cluster. The act 408 continues until each cluster description has been processed by the NLP model.

In act 412, the engine 120 receives the summary descriptions 124 from the NLP model within responses to the API calls.

In act 414, the engine 120 stores the summaries that are correlated to their respective clusters as summary descriptions 124. In some examples, the engine 120 communicates a message to the placement engine 126 that indicates the availability of the summary descriptions 124 for placement.

It should be noted that in some embodiments, e.g., when the final audio description is complete and being edited, a describer may insert, via a describer interface 1240, an input into an available location within the source media. The input can include a new audio description or an edit of a summary description 124 that have already been placed and assigned to a respective location, as further described below. In these embodiments, the engine 120 is configured to execute process 400 to store the describer input and its associated location. In some examples, the engine 120 communicates a message to the placement engine 126 that indicates the availability of the summary descriptions 124 for placement.

Figure 5B:
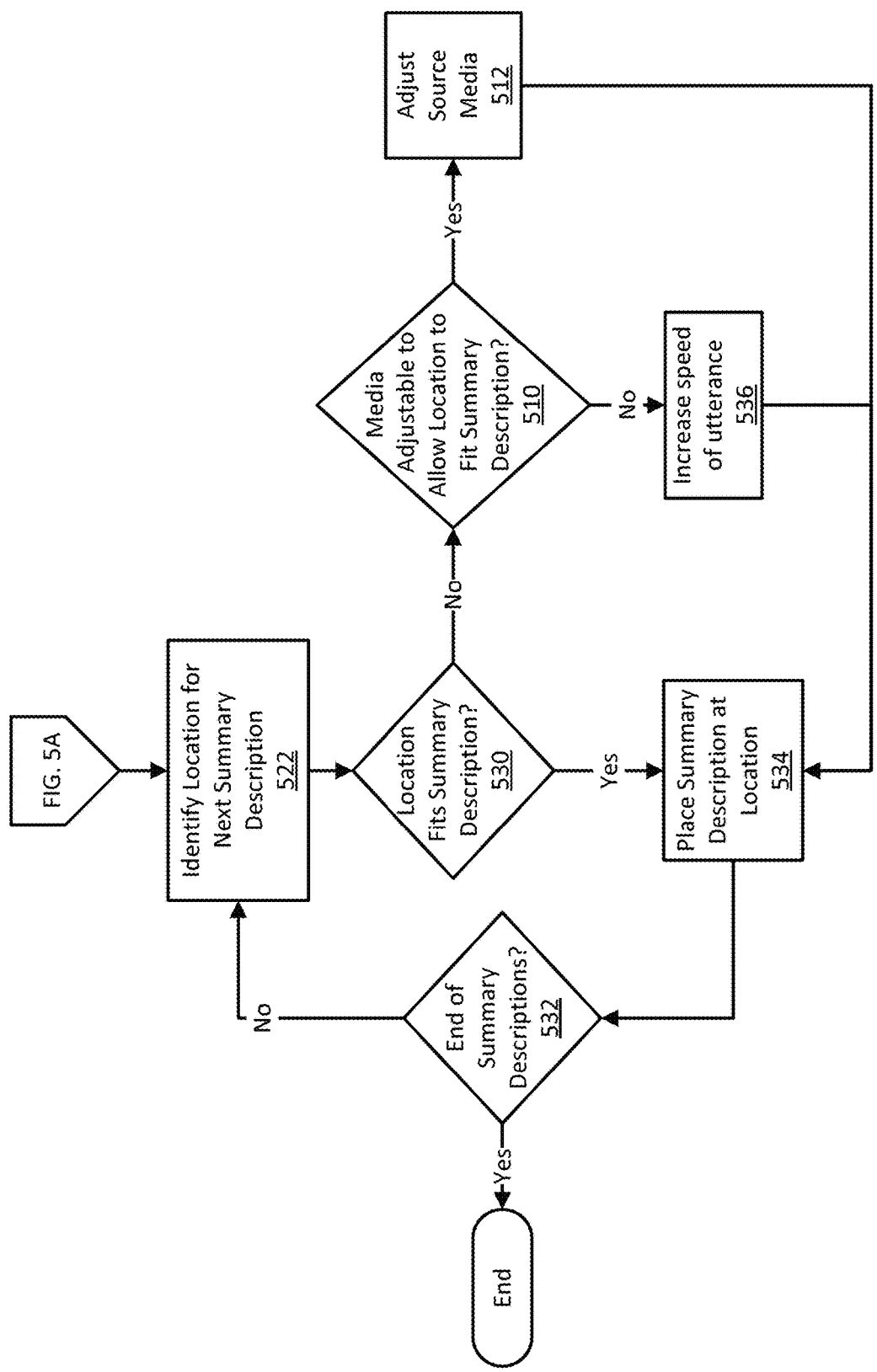

Returning to FIG. 1, in some embodiments, the engine 120 is configured to communicate, upon completion of the process 400 of FIG. 4, a message indicating the availability of the summary descriptions 124 to the description placement engine 126. In some embodiments, the engine 126 is configured to place the summary descriptions (e.g., the summary descriptions 124 of FIG. 1) in locations identified by a cluster engine (e.g., the cluster engine 114 of FIG. 1). FIGS. 5A and 5B illustrate an example process 500 that the engine 126 is configured to execute in some instances.

As shown in FIG. 5A, the process 500 starts in act 502 with the engine 126 reading execution parameters. The execution parameters include, in some examples, selections made in the controls 1502 of FIG. 15 for operations 508, 520, and 510. For example, the controls 1502 present options for audio description type parameters to choose (e.g., standard or extended audio description). Extended audio description configures the engine 126 to enable locating descriptive audio at timestamps where original source audio may already exist, e.g. by pausing the original audio playback while the descriptive audio plays, or modifying the original media file audio to enable greater audibility for rendered audio description data.

In act 508, the engine 126 determines whether the audio description parameters specified in the execution parameters indicate that the audio description job is a standard job. If the engine 126 determines that the audio description parameters indicate that the audio description job is a standard job, the engine 126 proceeds to act 504. If the engine 126 determines that the audio description parameters indicate that the audio description job is not a standard job, the engine 126 proceeds to act 522 of FIG. 5B.

In act 504, the engine 126 chooses a respective location (e.g., gap) for a next, unprocessed summary description. The engine 126 can evaluate the locations and identify which location is the best suited for each summary description. In some embodiments, the engine 126 evaluates characteristics of each location, such as location duration, audio levels in the location, position of the location in relation to a cluster associated with the summary description, etc. to determine a rating for how well a location is suited to contain the summary description. The engine 126 can weight these characteristics based on weights specified in the execution parameters. Further, in some examples, the engine 126 estimates a spoken duration for the summary description and compares the spoken duration with a duration of a location when identifying a placement location. A variety of processes may be used by engine 126 to estimate the spoken duration, some of which are described below. The engine 126 selects the location with the highest rating for placement of the summary description. In an alternative embodiment, the engine 126 identifies and selects a location having the largest duration that has the closest proximity to the cluster associated with the summary description. In some examples, the engine 126 requires that locations be located within a configurable threshold value of a cluster to be qualified to contain a summary description associated with the cluster.

Within the act 504, the engine 126 may estimate the spoken duration of the summary description using any of a variety of processes. For instance, in one embodiment, the engine 126 estimates durations of audio description text by generating audio description data corresponding to the audio description text, rendering the audio description data into an audio description file (e.g., a wave file), and measuring the duration directly from the wave file. For example, a wave file of 100 KB at 32 KB/second resolution (e.g., 16 KHz sampling rate with 16-bit sample representation) would yield an estimate of 3.125 seconds. In practice, dynamically generating audio description files by speech synthesis frequently may be too computationally expensive, and therefore estimations made from text characteristics may be more practical in some applications.

In another embodiment, the engine 126 estimates the number of syllables directly from the orthographic length of audio description text. For instance, in one embodiment, the engine 126 divides the orthographic length by a constant factor (e.g., 2.5) as follows.

$N\_syllables=length(description\_text)/2.5$

N_syllables will then be scaled by a typical syllable duration, at the currently configured speaking rate, for example 0.1 seconds at 250 words/minute. In this instance, an estimate of the entire duration of the audio description text can be calculated using the following equation.

$Estimated\_Duration=N\_syllables*0.1$

In another embodiment, the engine 126 is configured to estimate the number of syllables in the audio description text by a syllable counting process. One pseudocode example of a syllable counting process follows.
   def count_syllables(description_text)
   # count vowel clusters, including accounting for common accented characters:
   n_syllables
   description_text.scan(/
     [aeiouy\u0225\u0233\u0237\u0243\u0250\u0252]+/i).
     count
   # add a syllable for each digit or "point" indicated by the text:
   n_syllables+=description_text.scan(/[0-9\/]|\B\.\B/i).
     count
   #2 syllables for any "colon"
   n_syllables+=(description_text.scan(/\B\:\B/).count*2)
   #3 syllables for "underscore"
   n_syllables+=(description_text.scan(/_/).count*3)
   # Appropriate counts for URL verbalizations:
   n_syllables+=3 if description_text.match(/www/i)
   n_syllables+=4 if description_text.match(/http/i)
   n_syllables+=1 if description_text.match(/https/i)
   # Make sure there is at least one syllable per 2.5 orthographic characters, excluding spaces:
   n_syllables=[n_syllables, description_text.sub(","""").length/2.5].max
   return n_syllables
   end In an alternative embodiment, the engine 126 converts the entire audio description text into a phoneme sequence using a phonetic dictionary. In this embodiment, the engine 126 may look up the phoneme durations into a table, for example /b/=>0.05 seconds, /aa/=>0.28 seconds, etc., and then apply similar scaling.

In an alternative embodiment, the engine 126 combines duration estimation methods to get a more accurate estimate with less computation. For example, if audio description text duration was measured directly via an explicitly generated wave file, and the audio description text is subsequently changed, the new duration may be estimated as a difference from the old (measured) duration using a differential analysis of the old and new text. For example, take the case where a wave file was generated from the following audio description text: "The child plays with the lid.", and the audio waveform for this audio description text measures 2.8 seconds. Further, in this case, the describer modifies the audio description text to be: "The child plays with the lid of the box."

In this example, the description placement engine 126 estimates the rendered duration of new audio description data generated from the new audio description text to be: 2.8+text_duration_estimate ("of the box"), where the text_duration_estimate function uses one of the methods described above.

In some embodiments, the engine 126 synthesizes audio description text into audio description data stored in audio description files (e.g., wave files). In some embodiments, the engine 126 receives (e.g., from the describer interface 140) and processes requests to synthesize audio description text into audio description data stored in audio description files (e.g., wave files). In these embodiments, the engine 126 accesses audio description configuration settings and interoperates with a speech synthesis engine to generate the audio description files according to the settings. The actual duration of these descriptive audio files can be readily determined per above.

Continuing with FIG. 5, in act 506, the engine 126 determines whether the summary description fits the location identified in the operation 504. In some instances, even the best location for a summary description may be of a duration insufficient to render the entire summary description in a comprehendible manner. As such, in some examples, the engine 126 compares the estimated spoken duration with a duration of a targeted location to determine whether the location is of a sufficient duration. In some embodiments, in act 506 if the engine 126 determines that the duration of the summary description fits a duration of a targeted location, then the process 500 proceeds to act 516. If the engine 126 determines that the duration of the summary description does not fit within the duration of the targeted location, then the process 500 proceeds to act 520.

In act 516, the engine 126 places the summary description at the targeted location and synchronizes, within audio description transcription data, the beginning time index of the summary description 124 with the beginning time index of the targeted location. In some examples, the targeted location may be referred to as a placement period.

In act 520, the engine 126 determines whether the audio description parameters specified in the execution parameters indicate that the audio description job may be shifted to an extended job. If the engine 126 determines that the audio description parameters indicate that the audio description job may be shifted to an extended job, the engine 126 changes the job type to extended and proceeds to the act 522 of FIG. 5B. If the engine 126 determines that the audio description parameters indicate that the audio description job may not be shifted to an extended job, the engine 126 proceeds to act 527.

In the act 527, the engine 126 calculates a description importance score (or retrieves a pre-calculated description importance score) for the cluster summarized by the summary description and determines whether the calculated score transgresses a threshold value (e.g., is greater than 0.5). If the engine 126 determines that the description importance score transgresses the threshold value (e.g., is important), the engine 126 proceeds to act 514. If the engine 126 determines that the description importance score fails to transgress the threshold value (e.g., is unimportant), the engine 126 discards the summary description and returns to the act 518.

In act 514, the engine 126 generates a message specifying a request for the description engine 1238 to generate a summary description and communicates the message to the engine 1238. This message may specify the requested source media as being the source media spanning the cluster associated with the current summary description and a maximum summary length. In these examples, the engine 1238 receives the request and implements the architecture 100 of FIG. 1 to generate a new summary description but constrains the length of the candidate summaries generated by the ITT model 110 and the NLP model 122 of FIG. 1 to be less than or equal to the maximum summary length. Once the new summary description is generated, the engine 1238 returns it to the engine 126 in a response to the message, and the process 500 continues.

In act 526, the engine 126 determines whether the adjusted summary description fits the location identified in the operation 504. In some examples, the engine 126 compares an estimated spoken duration of the adjusted summary description with a duration of the location to determine whether the location is of a sufficient duration. In some embodiments, in act 526 if the engine 126 determines that the duration of the adjusted summary description fits a duration of a targeted location, then the process 500 proceeds to act 516. If the engine 126 determines that the duration of the adjusted summary description does not fit within the duration of the targeted location, then the process 500 proceeds to act 528.

In the act 528, the engine 126 rejects the audio description job as the system is unable to complete the job given the parameters of the job and the content of the media file. Subsequent to rejection of the job, the process 500 may end.

Alternatively or additionally, in some embodiments, in the act 514 the engine 126 searches for another location (e.g., gap) at which to place the summary description. For instance, in some examples, the engine 126 assesses all locations within a threshold proximity of the currently selected location for compatibility (e.g., sufficient duration) with the summary description, regardless of whether the location is already associated with another summary description. In these examples, if the engine 126 finds a compatible location that is associated with a summary description, the engine 126 arbitrates between the summary descriptions to identify one to place in the compatible location. This arbitration may consider description importance and or description proximity to its associated cluster, among other factors. Further, in these examples, if the engine 126 finds a compatible location that is not associated with another summary description, the engine 126 places the summary description within the compatible location.

In act 518, the engine 126 determines whether additional summary descriptions not yet processed by this instance of the process 500 exist. If unprocessed summary descriptions exist, the engine 126 selects a next, unprocessed summary description to be the currently selected summary description and proceeds to the act 504. If no unprocessed summary descriptions exist, the process 500 may end.

Turning now to FIG. 5B, if the audio description job is an extended job, or was shifted to an extended job, the engine 126 enables extended audio description for summary descriptions that cannot be fit into an identified location within the source media. Extended audio description permits original audio modification (or original video pausing) and may allow audio description to proceed independently of the location times available as determined from the transcript or audio analysis. In at least one embodiment, any ordered audio descriptions that cannot be completed as standard audio description are automatically shifted to extended audio description. In this embodiment, audio description orders need not be canceled due to lack of sufficient locations.

In act 522, the engine 126 chooses a respective location (e.g., gap) for a next, unprocessed summary description. The engine 126 can evaluate the locations and identify which location is the best suited for each summary description. In some embodiments, the engine 126 evaluates characteristics of each location, such as location duration, audio levels in the location, position of the location in relation to a cluster associated with the summary description, etc. to determine a rating for how well a location is suited to contain the summary description. The engine 126 can weight these characteristics based on weights specified in the execution parameters. The engine 126 selects the location with the highest rating for placement of the summary description. In an alternative embodiment, the engine 126 identifies and selects a location having the largest duration that has the closest proximity to the cluster associated with the summary description. In some examples, the engine 126 requires that locations be located within a configurable threshold value of a cluster to be qualified to contain a summary description associated with the cluster. Further, in some examples in which extended audio description has been selected, the engine 126 weights locations that include sentence boundaries and/or paragraph boundaries more over other locations.

In act 530, the engine 126 determines whether the summary description fits the location identified in the operation 522. In some instances, even the best location for a summary description may be of a duration insufficient to render the entire summary description in a comprehendible manner. As such, in some examples, the engine 126 compares the estimated spoken duration with a duration of a location to determine whether the location is of a sufficient duration. In some embodiments, in act 530 if the engine 126 determines that the duration of the summary description fits a duration of a targeted location, then the process 500 proceeds to act 534. If the engine 126 determines that the duration of the summary description does not fit within the duration of the targeted location, then the process 500 proceeds to act 510.

In act 534, the engine 126 places the summary description at the targeted location and synchronizes, within audio description transcription data, the beginning time index of the summary description 124 with the beginning time index of the targeted location. In some examples, the targeted location may be referred to as a placement period.

In act 510, the engine 126 determines whether the audio description parameters specified in the execution parameters indicate that the source media is adjustable to allow a location to fit a summary description. If the engine 126 determines that the audio description parameters indicate that the source media may be adjusted, the engine 126 proceeds to act 512. If the engine 126 determines that the audio description parameters indicate that the source media cannot be adjusted, the engine 126 proceeds to act 536.

In act 536, the engine 126 varies the speaking rate used to audibly render the summary description. For example, the engine 126 may use a nominal speaking rate of 250 words/minute, but where this option is selected, the engine 126 is configured to selectively speed up the speaking rate in order to fit the summary description into shorter time periods than would be possible at a slower speaking rate. It is appreciated that any of these options may impact the automatic cancellation or shifting methods described herein. For example, setting a faster speaking rate, or enabling a variable speaking rate, may allow a lower duration threshold for locations. In some embodiments, the engine 126 can change the speed of utterance setting based on a duration of a selected location and the duration of a summary description. This is accomplished by measuring the speed of utterance (duration) of the summary description and comparing it to the duration of the corresponding location. The difference (or ratio) between the durations will dictate how much faster the speed of utterance the summary description must be to fit the duration of the location. Alternatively or additionally, in some examples, the engine 126 changes the summary description (e.g., replacing words in the summary description with shorter synonyms) until the speed of utterance of the new summary description is less than the duration of the location. When the audio description data is modified then the process moves to act 534.

In act 512, the engine 126 executes signal processing methods to, for example, decrease the amplitude of the original media file audio signal, or filter the signal, as described below, within locations. Even when there are locations in a media file sufficient for audio description, there can often be loud background music or other sounds that make simply mixing additional audio (e.g., by adding the digital samples from multiple audio files) problematic. It is common practice in many types of media to maximize the volume of these sections such that there is very little "headroom," which refers to how much additional volume can be inserted before reaching the maximum levels of the digital medium. In these cases, simply superimposing an audio description track on the original audio could result in undesirable clipping (i.e., exceeding the per-sample resolution of the digital waveform encoder). Even if there is sufficient headroom, the audio description track might be difficult to make out and understand when played simultaneously with these competing sounds and music. Thus, in some embodiments, the engine 126 modifies the original audio data of the source media to allow the summary description to be intelligible and to be played without distortion.

In some embodiments, this modification is accomplished by creating a filtered version of the original audio data for each location in which audio description data is targeted for audible rendering (as defined, for example, by the audio description manifest described below), and then applying a crossfade over a period of, for example, 10 milliseconds between the original and filtered version. In one embodiment, the filtered version is modified from the original audio data by lowering its volume (e.g., by a linear volume adjustment scale of 0.5), and then applying fast multi-band dynamic range compression, (e.g., using attack/release times of 2-50 milliseconds, and a compression ratio of 2:1). Multi-band compression is used both to selectively attenuate louder components of the signal as well as to subtly alter the spectral shape of the original audio signal, which makes it easier for listeners to distinguish the spoken description from the background signal. In this embodiment, frequency bands and compression settings within each band are designed to make the original audio track less attention-capturing than the audio description track. For example, high frequencies (>3 kHz) may be strongly attenuated to result in a slightly muffled sound in the original audio, and low frequencies (<800 Hz) may be attenuated to make the original audio sound slightly thinner and less booming.

In an alternative embodiment, only linear volume adjustment is used so as to not modify the character of the original audio signal.

In an alternative embodiment, a linear EQ filter is added to the signal path for spectral shaping, which also preserves the original character of the original audio signal more than multi-band compression.

In an alternative embodiment, mid frequencies (between roughly 500 and 3000 Hz) are attenuated instead of high and low frequencies as these frequencies contain the majority of speech. In some instances, this approach may result in more intelligible audio description narratives.

In an alternative embodiment, stereo or spatial filters are added to the signal path. These filters can include panning the original audio signal slightly, such as by attenuating it in either left or right channels by several dB, or an equivalent tens of degrees or more of stereo panning, and adding a phase difference between left and right channels. This spatial difference helps to increase the perceptual difference between the competing original audio data and audio description data (which may be stored in tracks), allowing the listener to better focus on the audible rendering of either the original audio data or the audio description data.

Alternatively or additionally, in act 512 the engine 126 may pause the video so that audio descriptions may be inserted in a way that does not overlap with the original media file audio. Thus, the engine 126 effectively extends the duration of the original media file by inserting replicated image frames into the original video data and inserting silence into the original audio data, both for a duration equal to the duration of the summary description positioned at that point of the media file.

Alternatively or additionally, in the act 512, the engine 126 generates instructions to be included in audio description output files to adjust playback of the original media file. These instructions may include, for example, commands for a player (e.g., a player included in the customer interface 1224 and downloaded to the client computer 1204 of FIG. 12) to pause the video at the given point, for a given duration, and to play back the descriptive audio during the pause. Thus, in these examples, the audio description output files include the instructions, combined with descriptive audio snippets. The instructions point to which snippet is to be played at which location in the time index of the media file, and specify for how long the original media file is to be paused. In some examples, descriptive audio snippets are replaced with text of audio description that is to be audibly rendered (e.g. by a screen/text reader or other client-side synthesis control interoperating with or integrated within the player) at a specified location (e.g., a timestamp) in the original audio. In these examples, the instructions cause the player to pause the original audio at the specified location, send commands to the client-side synthesis control to synthesize and return audio corresponding to the text, play back the synthesized audio, and then resume playing the original audio.

In act 532, the engine 126 determines whether additional summary descriptions not yet processed by this instance of the process 500 exist. If unprocessed summary descriptions exist, the engine 126 selects a next, unprocessed summary description to be the currently selected summary description and proceeds to the act 522. If no unprocessed summary descriptions exist, the process 500 may end.

In some embodiments, the description engine 1238 is configured to execute a final pass through the audio description 128 to affect the verbosity of the audio description 128. For instance, in some examples, the description engine 1238 receives a request from the customer interface 1224 or the describer interface 1240 to decrease the verbosity of the audio description 128. In response to this request, the description engine 1238 may remove summary descriptions from the audio description 128 that are associated with a description importance score that is less than a threshold value (e.g., summaries with description importance scores in the lower 10% of the population).

Figure 6:
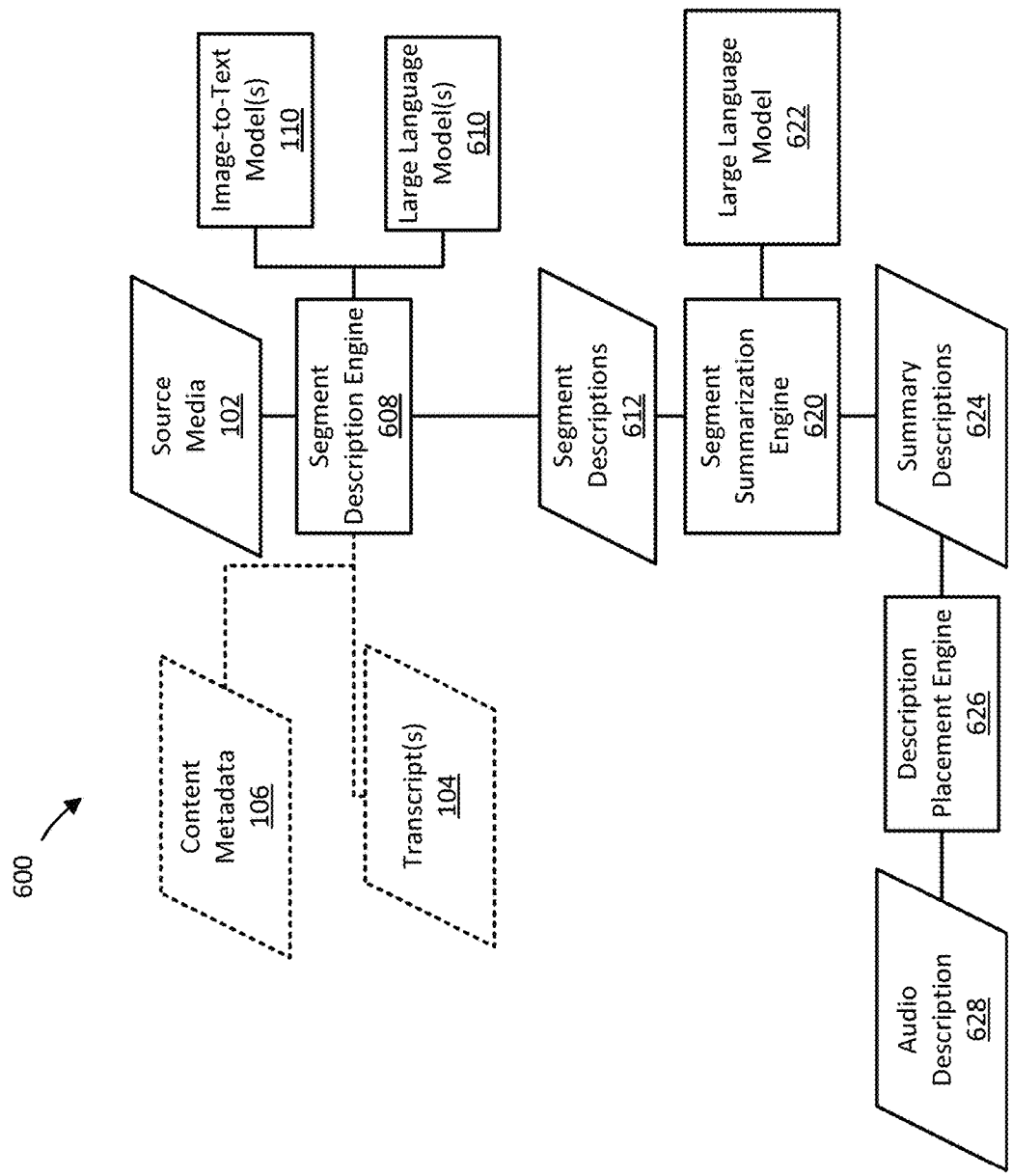
FIG. 6 is a block diagram of another architecture implemented within an audio description system according to at least one embodiment described herein.

FIG. 6 is a block diagram illustrating another architecture 600 implemented by the description engine 1238 in some embodiments. The architecture 600 is configured to generate audio descriptions from source media. As shown in FIG. 6, the architecture 600 includes a segment description engine 608, an ITT model 110, a first LLM 610, a segment summarization engine 620, a second LLM 622, and a description placement engine 626. The second LLM 622 may be trained and/or fine-tuned using audio description transcripts considered to be high-quality, such as those obtained from audio description jobs completed by human experts. These high-quality audio descriptions may use verbiage that is succinct but descriptive, focus on critical elements of the video vs background, avoid redundancy, and describe details that tend to not be inferable from typical dialog (e.g. unvoiced facial expressions), for example.

In some embodiments, the engine 608 is configured to receive and process source media 102, one or more transcripts 104 of audio included within the source media 102, and other metadata 106 descriptive of the source media 102. The source media 102 may include one or more media files from a media file data store, such as media files stored in the media file store 1236 described further with reference to FIG. 12. The source media 102 can include individual frames and/or audio time offsets that each correspond to a single timestamp within the source media 102; segments that include multiple frames (e.g., spanning 5-30 seconds); and an entire video that is made up of multiple segments. In some examples, each segment spans an interval of the time index of the source media via the positions of the frames on the time index that make up the segment. Durations are configured via the administrative interface, in some examples. The one or more transcripts 104 may include one or more time-coded transcripts generated via operation of a transcription marketplace, as illustrated and described herein with reference to FIG. 12, or otherwise obtained via operation of a client interface, such as the customer interface 1224 described further herein with reference to FIG. 12. The metadata 106 may include images, video, and audiovisuals from the media storage file that depict entities labeled in the transcript(s) 104.

Figure 7:
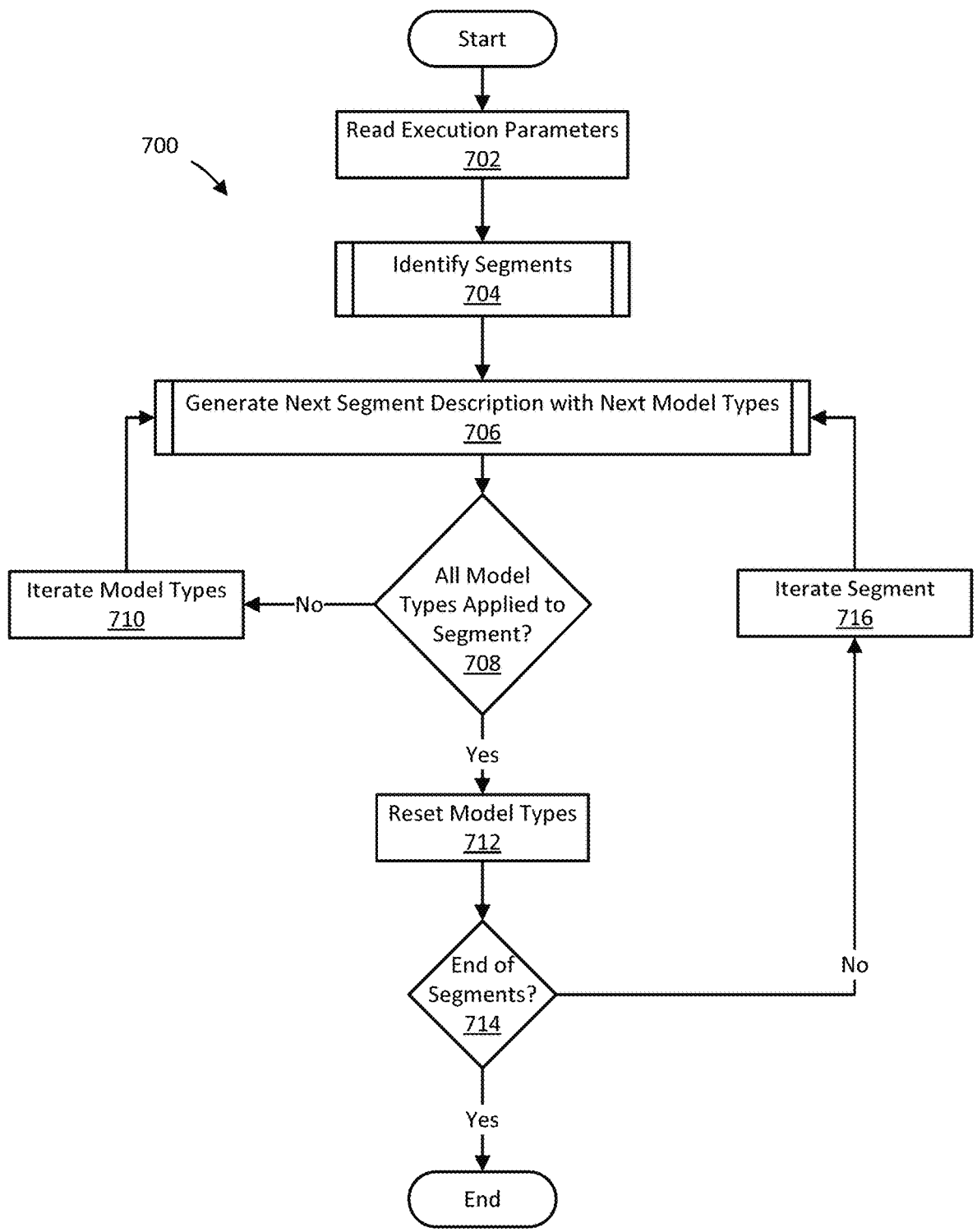
FIG. 7 is a flow diagram illustrating a process of generating segment descriptions for a plurality of segments according to at least one embodiment described herein.

In certain embodiments, the processing that the engine 608 is configured to execute includes interoperating, via API calls, with the model 110 and the LLM 610 to develop segment descriptions 612 using the source media 102, the transcripts 104, and the other metadata 106. FIG. 7 depicts one example of a process 700 executed by the engine 608 in some implementations.

As shown in FIG. 7, the process 700 starts in act 702 with the engine 608 reading execution parameters. These parameters include, in some examples, one or more of one or more identifiers of one or more modalities to be used to identify segments within operation 704, an indicator of a segment size to be used within the operation 704, a step size to be used within the operation 704, an indicator of whether all content within a section is to be scanned within operation 706, and/or one or more indicators of one or more models to be used as controllers within the operation 706.

Figure 8:
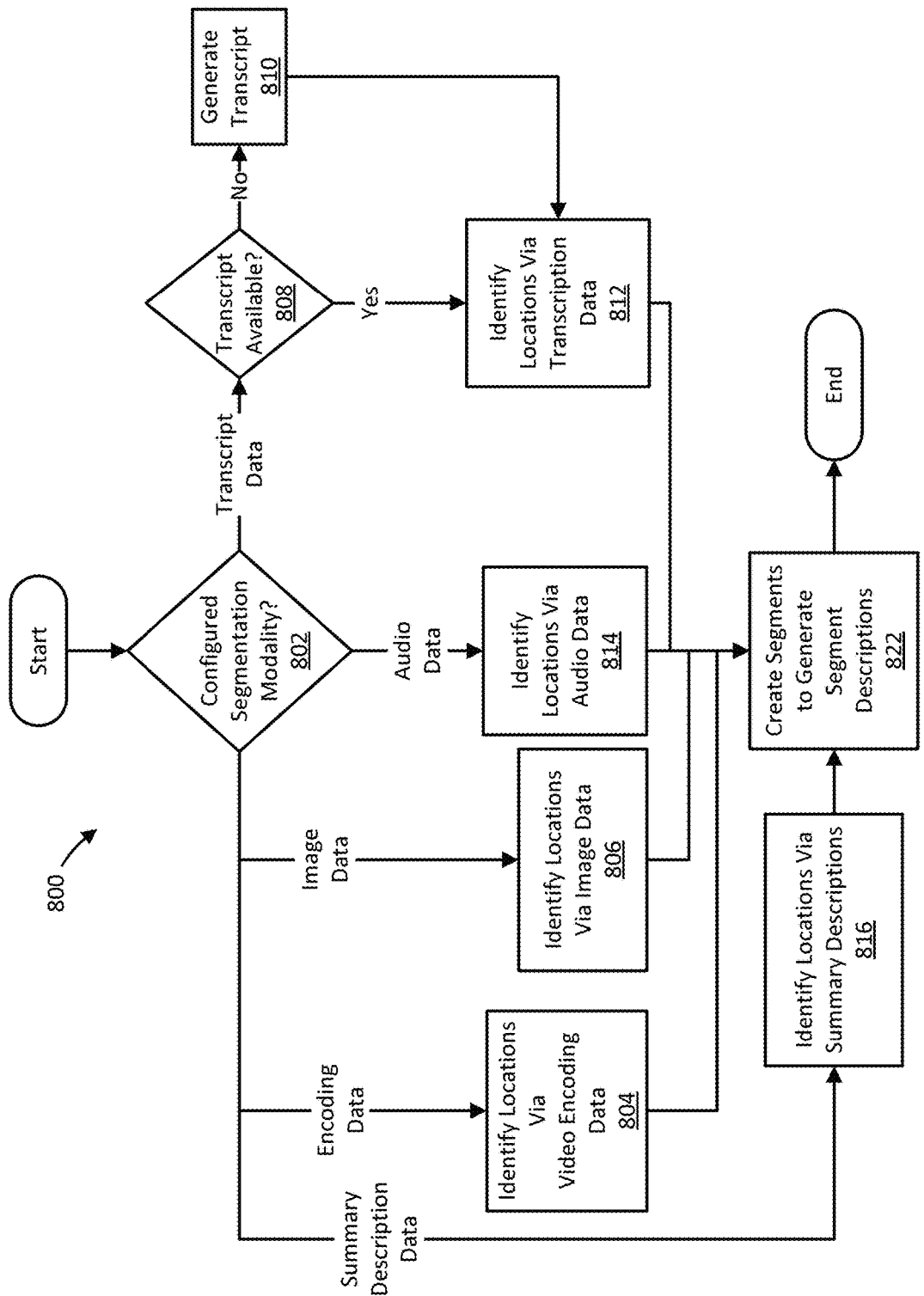
FIG. 8 is a flow diagram illustrating a process of identifying segments according to at least one embodiment described herein.

In act 704, the engine 608 identifies segments within source media (e.g., the source media 102 of FIG. 6). For instance, in some embodiments, the engine 608 identifies uniformly spaced segments spanning Nth frames throughout the source media. In other embodiments, the engine 608 identifies segments using a process that analyzes the images and/or audio included in the source media. FIG. 8 illustrates a process 800 executed by the engine 608 within the act 704 in some examples.

As shown in FIG. 8, the process 800 starts in act 802 with the engine 608 enumerating one or more modalities to be used to define locations within the source media. These modalities may be identified within execution parameters, such as those read in the operation 702 of FIG. 7.

If the one or more modalities include analysis of video encoding data, in act 804 the engine 608 identifies locations via a video encoded version of the source media. For instance, in some examples, the engine 608 inspects the video encoded version for one or more statistical features that indicate locations in the source media suitable for placement of audio description and/or segment boundaries. Examples of such features include keyframes. Further, within the act 804, the engine 608 records a position (e.g., a timestamp) of the statistical features to earmark endpoints of locations and/or segments.

If the one or more modalities include analysis of image data, in act 806 the engine 608 identifies locations by comparing images obtained from neighboring frames within the source media. For instance, in some examples, the engine 608 applies one or more computer vision (CV) models to the images within the source media to find scene changes depicted within the source media. In certain examples, scene changes in which one or more objects appear or disappear or other substantial changes occur in neighboring images may indicate locations in the source media suitable for placement of audio description and/or segment boundaries. Further, within the act 806, the engine 608 records positions (e.g., timestamps) of the scene changes to earmark endpoints of locations and/or segments.

If the one or more modalities include analysis of the audio data, in act 814 the engine 608 identifies locations via audio data obtained from the source media. For instance, in some examples, the engine 608 scans the audio data for periods of silence or other static content. In certain examples, periods of silence indicate locations in the source media suitable for placement of audio description and/or segment boundaries. Further, within the act 814, the engine 608 records a position (e.g., timestamp) for the beginning and ending of each period of silence to earmark endpoints of locations and/or segments.

If the one or more modalities include analysis of transcription data, in act 808 the engine 608 determines whether a transcript of the source media is available. For instance, in some examples, the engine 608 queries a data store, such as the media file storage 1236 of FIG. 12, for metadata associated with the source media that specifies a reference to a transcript. If the engine 608 determines that a transcript of the source media is available, the engine 608 proceeds to act 812. If the engine 608 determines that a transcript of the source media is not available, the engine 608 proceeds to act 810.

In act 810, the engine 608 initiates generation of a time-coded transcript of the source media. The act 810 may include a variety of processes, according to various embodiments and these processes are described above with reference to operation 310 of FIG. 3. The processes, in turn, generate a transcript for use by the engine 608 within act 812, and return a reference to or copy of the transcript to the engine 608.

In act 812, the engine 608 identifies locations via transcription data included in the transcript. For instance, in some examples, the engine 608 applies one or more discriminative NLP models such as LDA or ETM that can be used to detect a change in topic. In certain examples, topic changes may indicate locations in the source media suitable for placement of audio description and/or segment boundaries. Alternatively or additionally, in some examples, the engine 608 finds time gaps and/or changes in speakers within the transcription data. In certain examples, time gaps and/or changes in speakers may indicate locations in the source media suitable for placement of audio description and/or segment boundaries. Further, within the act 812, the engine 608 records a position (e.g., timestamp) of the topic changes to earmark endpoints of locations and/or segments.

If the one or more modalities include analysis of summary description data, in act 816 the engine 608 identifies locations via summary descriptions previously generated by the architecture illustrated and described herein with reference to FIG. 1. For instance, in some examples, the engine 608 scans the summary descriptions for endpoints of clusters corresponding to the summary descriptions. In certain examples, endpoints of clusters indicate endpoints of locations. Further, within the act 816, the engine 608 records a position (e.g., timestamp) of the endpoints of the clusters to earmark endpoints of locations and/or segments.

In act 822, the engine 608 creates sequential and possibly overlapping segments within a configurable proximity to identify the locations and generates segment descriptions for the created segments. For instance, in some examples, the engine 608 creates segments via execution of an election process that considers some or all of the previously identified locations. Further in some examples, the election process considers the modality through which the locations were identified. For instance, the election process may weight locations identified through particular modalities more heavily than other locations. As an example, it may be preferable to place a description in a gap in audio content, but failing that a scene change would be next most suitable. It should be noted that, as part of the act 822, the engine 608 may create segments that span one or more locations and may require elapsed time between created segments be less than a configurable threshold value (e.g., 5 seconds, 10 seconds, 15 seconds, 20 seconds, 25 seconds, 30 seconds, to name a few example threshold values). The allowable elapsed time between created segments may be constrained by a step size parameter obtained by execution of the operation 702 of FIG. 7. The engine 608 may require that segments have a minimum size (e.g., duration). The minimum size may be defined by a segment size parameter obtained by execution of the operation 702. The engine 608 may record endpoints of the created segments, and locations between and within the segments may be considered when placing audio description, which is described further below with reference to FIGS. 11A and 11B.

Figure 9A:
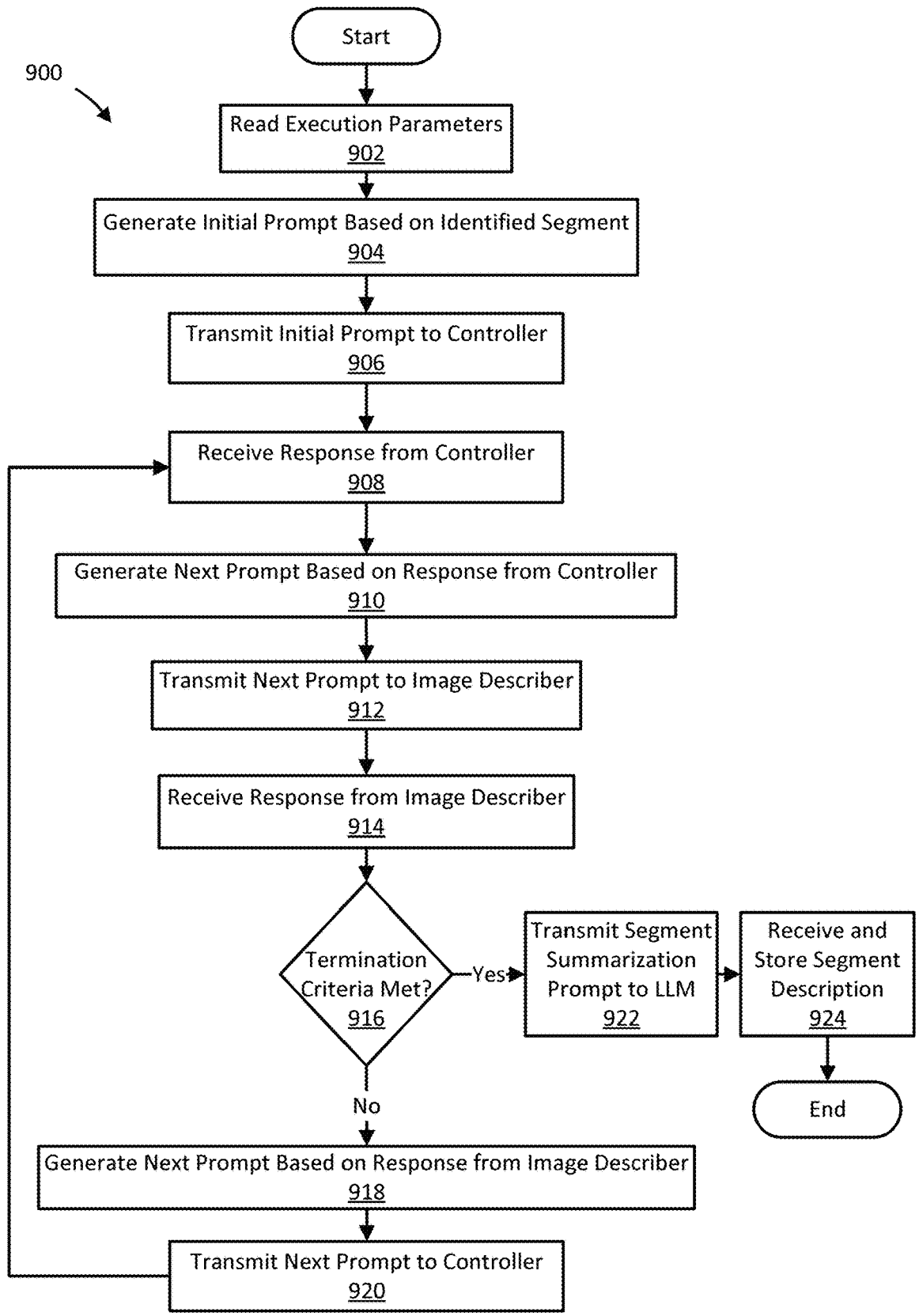
FIG. 9A is a flow diagram illustrating a process of orchestrating interoperations between generative artificial intelligence (AI) models according to at least one embodiment described herein.

Returning to FIG. 7, in act 706, the engine 608 generates a segment description for the next unprocessed segment. In some embodiments, the engine 608 selects the segments in sequential order from source media (e.g., the source media 102 of FIG. 6) and processes each segment to obtain a correlated segment description, as further described below. One example of a process 900 executed by the engine 608 within the act 706 is illustrated in FIG. 9A. In the process 900, the engine 608 orchestrates a conversation between generative AI models to develop a segment description for an identified, unprocessed segment.

As shown in FIG. 9A, the process 900 starts in act 902 with the engine 608 reading execution parameters. For instance, in some examples, the engine 608 reads identifiers of a first generative AI model and a second generative AI model that will communicate with one another to generate a description of the selected segment. In this example, the first model may be referred to as a controller and the second model may be referred to as an image describer. In some examples, the controller is the LLM 610 of FIG. 6 and the image describer is the ITT 110 of FIG. 6. The image describer can be a visual question answering model (VQA) that is configured to answer questions about an image. The VQA can help teach the controller about the content of an image.

In act 904, the engine 608 generates an initial prompt to the controller to request a question for the image describer. In some embodiments, the prompt specifies but is not limited to, segment metadata, question format, question restrictions, and task instructions in the domain of video content understanding. For example, an initial prompt may include the following.

"The Controller is meant to be able to help with comprehension by posing numerous questions without viewing a film. Your questions will then be addressed by an expert. There are N frames in this segment. A frame with an index greater than N cannot have questions asked of it by the Controller. Without watching the movie, the Controller is meant to comprehend videos by posing intelligent and relevant questions.

Review the segment metadata. Design a frame sampling strategy within N frames to determine which frames, when addressed questions, would maximize information gain about segment understanding. Ask questions to obtain information regarding the segment. Do not ask questions about topics not mentioned in previous answers by the expert. The question format should avoid asking yes/no answers."

In some examples, the engine 608 uses a template and inserts segment metadata into the template to generate the prompt. The features of the prompt guide the controller to construct an initial prompt to the image describer that is focused on the particularities of the identified segment. For instance, the segment metadata may indicate to the controller one or more frames that are particularly important, thus leading the controller to construct questions regarding the one or more frames. The segment metadata may indicate the number of frames that are in the segment.

In act 906, the engine 608 calls, via an API, the controller to send the generated prompt to the controller.

In receiving and processing the prompt, the controller devises a frame sampling strategy that allows the controller to select certain frames, within the confines of the segment being processed, that allow the controller to optimize questions regarding the identified segment. The frame sampling strategy determines which frames the controller will need to process to maximize its understanding of the segment content and is based on the context the image describer passes to the controller.

In some examples, the controller selects a frame based on the frame sampling strategy and formulates a question based on the segment metadata, question format, question restriction inputs from the prompt, and task instructions. The question may be addressed to a particular frame, in some examples. The question restrictions can specify that valid questions must be addressed to frames within the identified segment. Alternatively or additionally, the question restrictions can specify that valid questions may only reference objects, individuals, places, etc. previously described by the image describer. Alternatively or additionally, the controller can be restricted to formulating questions having valid responses other than yes or no. The question format can specify how a question is to be syntactically constructed. As such, the question format can define a question's length, maximum number of topics, addressed frame, required elements (e.g., inclusion of metadata indicating a question number within the conversation log), etc.

In act 908, the engine 608 receives a response to the API call from the controller. The engine 608 parses the response to extract the question for subsequent processing.

In act 910, the engine 608 generates a prompt to the image describer to answer the question extracted in act 908. For instance, in some examples, the engine 608 stores the question as a payload within a data structure to be transmitted to the image describer. The image describer is prompted with inputs to generate a response with a higher confidence score and lower instances of inaccurate details in the response. For example, the image describer may be instructed to answer with "I do not know" to questions the image describer does not know the answer to, so that the image describer will have less opportunities to give inaccurate details. In some embodiments, the image describer is configured to effectively infer motion information in an image by training the image describer. This inference can give more accurate action answers to the controller's questions about what is happening in a frame.

In act 912, the engine 608 communicates the prompt, via one or more API calls, to the image describer. Based on the question and the prompt parameters, the image describer generates an answer to the question.

In act 914, the engine 608 receives the answer, via a response to the API call, from the image describer. Each answer may include a textual description of the content of a frame. The engine 608 updates the conversation log with the question generated by the controller and the response generated by the image describer.

In act 916, the engine 608 determines if criteria specifying conditions for terminating the conversation between the controller and the image describer are met. In some examples, the termination criteria specify a total number of questions and answers generated by the controller and the image describer. In some examples, the total number is determined based on the number of frames in the segment and a configurable parameter. For instance, in one example, the total number equals the number of frames in the segment multiplied by the configurable parameter.

In these examples, the engine 608 determines that the termination criteria are met if the number of questions asked equals the number of frames multiplied by the configurable parameter. The engine 608 can determine the number of questions asked by maintaining a counter that iterates with every loop the process 900 executes. When the counter has reached the total number, then the termination criteria are met. Alternatively, the engine 608 can identify question/answer indicators (e.g., strings) included in the questions and/or responses generated by the controller and/or the image describer. For example, a string of the value "Q30" included within a question may indicate that the controller has asked 29 previous questions. When the indicator has reached the total number, then the termination criteria are met. If the termination criteria are met, then the process 900 proceeds to act 922. If the termination criteria are not met, then the process 900 proceeds to act 918.

In act 918, the engine 608 generates a prompt based on the response from the image describer. The prompt includes the answer and the conversation log. The controller uses the current context, which includes the conversation log, to generate a new question. The conversation log can allow the controller to accumulate contextual information which enables the controller to generate more relevant questions.

In act 920, the engine 608 transmits the next prompt, via API, to the controller and returns to the act 908.

In act 922, the engine 608 generates a summarization prompt and communicates the summarization prompt to the controller via, for example, an API call. In some examples, the summarization prompt includes a complete copy of the conversation log along with a human language request to accurately summarize the segment discussed in the question-and-answer conversation between the controller and the image describer. The prompt may contain restrictions for the controller. These restrictions may include the number of sentences the segment description can include. Alternatively or additionally, the restrictions may include a requirement to only use information from the conversation log in generating the summary. Alternatively or additionally, the restrictions may include limiting or prohibiting descriptions of individual frames. Alternatively or additionally, the restrictions may include requiring use of information from only positive answers (e.g., answers other than "I don't know" or the like).

In act 924, the engine 608 stores the segment description in the segment descriptions 612 (e.g., in association with the identified segment) for subsequent processing, and the process 900 may end.

Figure 9B:
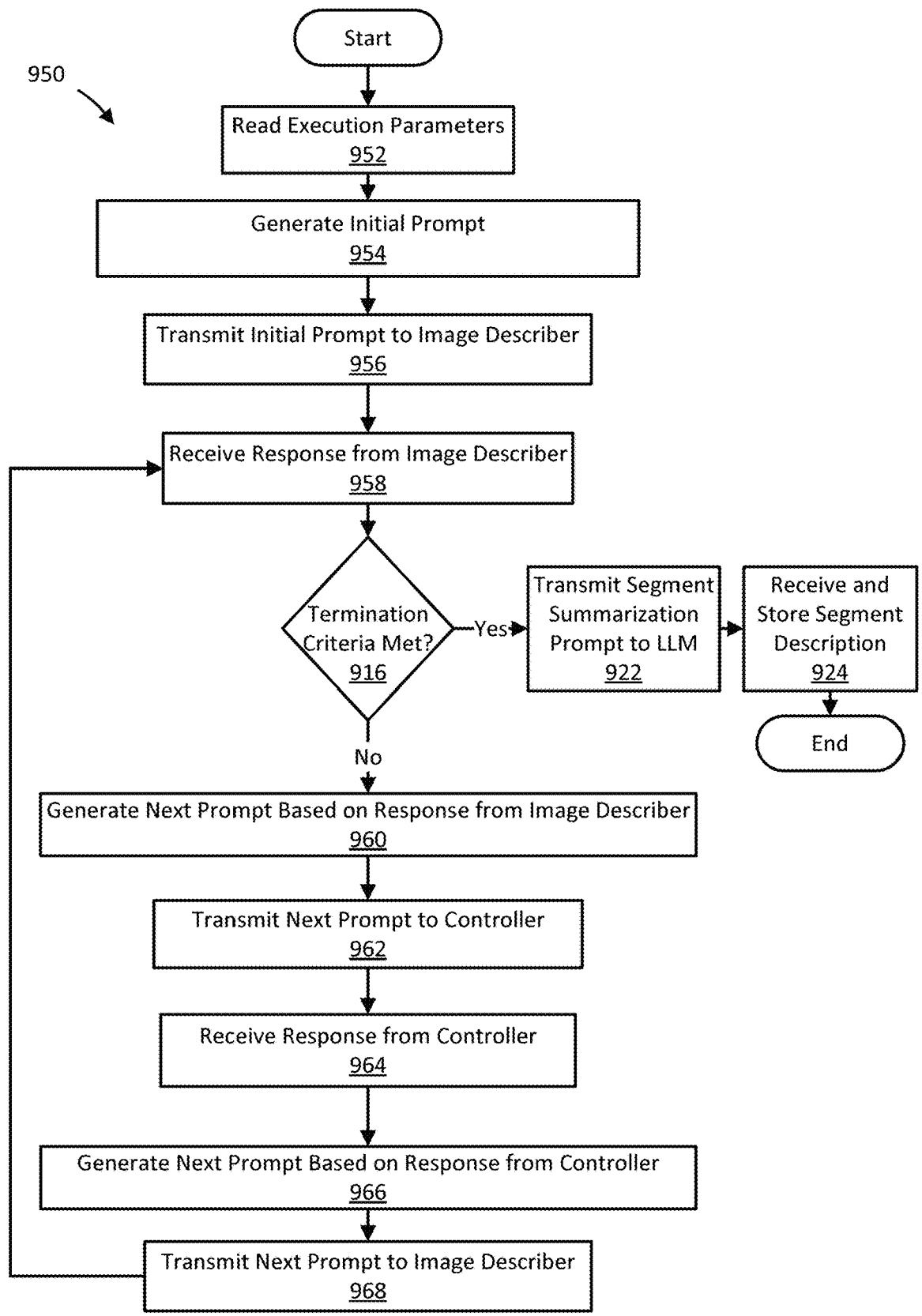
FIG. 9B is a flow diagram illustrating another process of orchestrating interoperations between generative artificial intelligence models according to at least one embodiment described herein.

Another example of a process 950 executed by the engine 608 within the act 706 is illustrated in FIG. 9B. As with the process 900, in the process 950, the engine 608 orchestrates a conversation between generative AI models to develop a segment description for an identified, unprocessed segment.

As shown in FIG. 9B, the process 950 starts in act 952 with the engine 608 reading execution parameters. For instance, in some examples, the engine 608 reads identifiers of a first generative AI model and a second generative AI model that will communicate with one another to generate a description of the selected segment. In this example, the first model may be referred to as a controller and the second model may be referred to as an image describer. In some examples, the controller is the LLM 610 of FIG. 6 and the image describer is the ITT 110 of FIG. 6. The image describer can be a visual question answering model (VQA) that is configured to answer questions about an image. The VQA can help teach the controller about the content of an image.

In act 954, the engine 608 generates an initial prompt to the image describer. For instance, in some examples, the initial prompt will comprise a character string articulating a request to describe an initial frame of the identified segment. In certain examples, a standardized (static) initial prompt, such as the following may be used.

"You are an expert video describer. Your job is to take a single frame from a video and the surrounding context (transcript, other descriptions) and provide a description of that scene that:

Is concise (use <n> words or less)
Describes things essential to the comprehension and enjoyment of the program
Portray only what is physically observable, rather than motivations or intentions
The content should match the style, tone, and pace of the program
Be neutral, simple, and succinct.
Does not inject personal interpretations or opinions The image is attached and here is the content surrounding this frame:

[Before Frame]
<several sentences of transcript data and descriptions before the frame in question>
[After Frame]
<several sentences of transcript data and descriptions after the frame in question>

Now supply the description of the frame."

In act 956, the engine 608 communicates the prompt, via one or more API calls, to the image describer. Based on the question and the prompt parameters, the image describer generates an answer to the question.

In act 958, the engine 608 receives the answer, via a response to an API call, from the image describer. The engine 608 updates a conversation log with the question generated by the controller and the response generated by the image describer.

In act 916, the engine 608 determines if criteria specifying conditions for terminating the conversation between the controller and the image describer are met. In some examples, the termination criteria specify a total number of questions and answers generated by the controller and the image describer. In some examples, the total number is determined based on the number of frames in the segment and a tunable parameter. For instance, in one example, the total number equals the number of frames in the segment multiplied by the tunable parameter. In these examples, the engine 608 determines that the termination criteria are met if the number of questions asked equals the number of frames multiplied by the tunable parameter. The engine 608 can determine the number of questions asked by maintaining a counter that iterates with every loop the process 900 executes. When the counter has reached the total number, then the termination criteria are met. Alternatively, the engine 608 can identify question/answer indicators (e.g., strings) included in the questions and/or responses generated by the controller and/or the image describer. For example, a string of the value "Q30" included within a question may indicate that the controller has asked 29 previous questions. When the indicator has reached the total number, then the termination criteria are met. If the termination criteria are met, then the process 950 proceeds to act 922. If the termination criteria are not met, then the process 950 proceeds to act 960.

In act 922, the engine 608 generates a summarization prompt and communicates the summarization prompt to the controller via, for example, an API call. In some examples, the summarization prompt includes a complete copy of the conversation log along with a human language request to accurately summarize the segment discussed in the question-and-answer conversation between the controller and the image describer. The prompt may contain restrictions for the controller. These restrictions may include the number of sentences the segment description can include. Alternatively or additionally, the restrictions may include a requirement to only use information from the conversation log in generating the summary. Alternatively or additionally, the restrictions may include limiting or prohibiting descriptions of individual frames. Alternatively or additionally, the restrictions may include requiring use of information from only positive answers (e.g., answers other than "I don't' know" or the like).

In act 924, the engine 608 stores the segmented description in memory for subsequent processing and the process 950 may end.

In act 960, the engine 608 generates a prompt to the controller based on the response from the image describer. In some embodiments, the prompt specifies but is not limited to, segment metadata, question format, question restrictions, and task instructions in the domain of video content understanding. In some examples, the engine 608 uses a template and inserts segment metadata into the template to generate the prompt. The prompt may further include a conversation log that includes the initial question to the image describer and the initial response from the image describer and any other subsequent questions and answers. The conversation log allows the engine 608 to accumulate contextual information for the controller, which enables the controller to generate more relevant questions. The features of the prompt guide the controller to construct an next question to the image describer that is focused on the particularities of the identified segment. For instance, the segment metadata may indicate to the controller one or more frames that are particularly important, thus leading the controller to construct questions regarding the one or more frames. The segment metadata may indicate the number of frames that are in the segment.

In act 962, the engine 608 calls, via an API, the controller to send the generated prompt to the controller. In receiving and processing the prompt, the controller devises and/or continues a frame sampling strategy that allows the controller to select certain frames, within the confines of the segment being processed, that allow the controller to optimize questions regarding the identified segment. The frame sampling strategy determines which frames the controller will need to process to maximize its understanding of the segment content and is based on the context the image describer passes to the controller.

In some examples, the controller selects a frame based on the frame sampling strategy and formulates a question based on the segment metadata, question format, question restriction inputs from the prompt, task instructions, and the conversation log. The question may be addressed to a particular frame, in some examples. The question restrictions can specify that valid questions must be addressed to frames within the identified segment. Alternatively or additionally, the question restrictions can specify that valid questions may only reference objects, individuals, places, etc. previously described by the image describer. Alternatively or additionally, the controller can be restricted to formulating questions having valid responses other than yes or no. The question format can specify how a question is to be syntactically constructed. As such, the question format can define a question's length, maximum number of topics, addressed frame, required elements (e.g., inclusion of metadata indicating a question number within the conversation log), etc.

In act 964, the engine 608 receives a response to the API call from the controller. The engine 608 parses the response to extract the question for subsequent processing.

In act 966, the engine 608 generates a prompt to the image describer to answer the question extracted in act 966. For instance, in some examples, the engine 608 stores the question as a payload within a data structure to be transmitted to the image describer. The image describer is prompted with inputs to generate a response with a higher confidence score and lower instances of inaccurate details in the response. For example, the controller asks about a background character. If there are no background characters, then the image describer might make up random information. By inputting into the image describer the option of answering with "I do not know" to questions the image describer does not know the answer to, then the image describer will have less opportunities to give inaccurate details. In some embodiments, the image describer is configured to effectively infer motion information in an image by training the image describer. This inference can give more accurate action answers to the controller's questions about what is happening in a frame.

In act 968, the engine 608 transmits the next prompt, via an API call, to the controller and returns to the act 958.

Returning to FIG. 7, in act 708, the engine 608 determines whether all models have been applied to the currently identified segment. For instance, in some examples, the architecture 600 includes a data store that lists a configurable set of models to be applied to each segment. The set of models may include combinations of ITT models, such as the ITT model 110, paired with LLMs, such as the LLM 610 that are trained, fine-tuned, or prompted for different use cases, such as generalized image captioning, video object detection and tracking, text detection, etc. This configuration enables conversational-based description of identified segments using a variety of models—thereby creating diverse sets of segment descriptions for subsequent analysis and summarization by the LLM 622. If the engine 608 determines that at least one combination of models has not been applied to the currently selected segment, the process 700 proceeds to act 710. If the engine 608 determines that all of the combinations of models have been applied to the currently selected segment, the process 700 proceeds to act 712.

In act 710, the segment description engine 608 iterates the models to be applied within the act 706.

In act 712, the engine 608 resets the models to be applied in the act 706 to the first combination of models (e.g., models 110 and 610 of FIG. 6).

In act 714, the engine 608 determines if the currently identified segment is the last segment identified in the source media. If the currently identified segment is the last segment, then the process 700 may end. If the currently identified segment is not the last segment, then the process 700 proceeds to act 716.

In the act 716, the engine 608 identifies the next unprocessed segment of the source media as the current segment.

Returning to FIG. 6, in some embodiments, the segment summarization engine 620 is configured to retrieve the segment descriptions 612 grouped by their correlated content segments, and interoperate, e.g., via API calls and responses, with the LLM 622 to summarize groups of the segment descriptions 612 to create a summary description for each content segment. The engine 620 is further configured to store the summary descriptions for each content segment within the summary descriptions 624. In some examples, each of the summary descriptions 624 can fit in a corresponding location in or near the content segment. One example of a process 1000 executed by the engine 620 is illustrated in FIG. 10.

Figure 10:
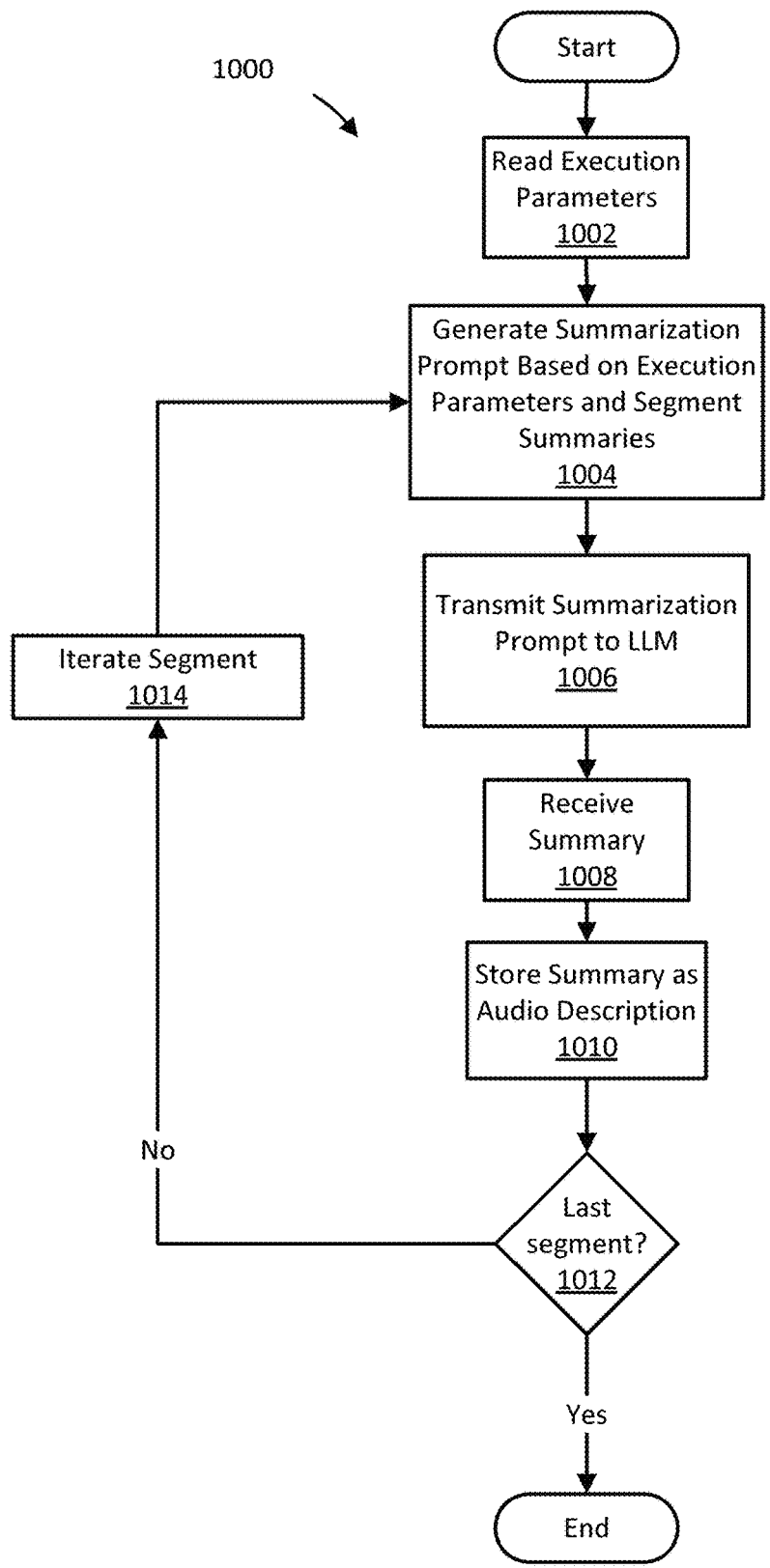
FIG. 10 is a flow diagram illustrating a process of generating audio descriptions according to at least one embodiment described herein.

As shown in FIG. 10, the process 1000 starts in act 1002 with the engine 620 reading execution parameters. The execution parameters may indicate required and prohibited vocabulary and the desired "tone" of the descriptions (playful, professional, somber, etc.), allowable forms of "prescience" in applying knowledge from a "future" portion of the video to generate descriptions for an "earlier" portion of the video (e.g., "don't spoil the ending").

In act 1004, the engine 620 generates a summarization prompt based on the execution parameters and the segment descriptions 612 of a corresponding and currently selected content segment. In some embodiments, the prompt can include a human language request to summarize each group of segment descriptions into an overall summary of the currently selected content segment. Alternatively or additionally, the prompt can include a software dictionary of vocabulary (e.g. proper nouns), phonetic mappings, and prohibited phrases that are relevant to a particular type of source content. Alternatively or additionally, the prompt can include a task to extract important phrases and vocabulary from a transcript produced by automatic speech recognition systems. The important vocabulary will be represented in the aforementioned dictionary.

In some examples of the act 1004, the engine 620 interoperates with a user interface (e.g., the describer interface 1240 of FIG. 12) to receive input modifying the summarization prompt and/or the software dictionary. For instance, the input may specify relevant word glossaries or express prompt text. The express prompt text may place constraints on the generated summary (e.g., maximum number of tokens), specify a writing style or target audience type, and/or specify a topic or category for the summary.

In act 1006, the engine 620 transmits, via an API call, the summarization prompt to the LLM 622. In some embodiments, the LLM 622 is configured to generate a summary description based on the prompt.

In act 1008, the engine 620 is configured to receive a response to the API call from the LLM 622 and process the response. The processing executed by the engine 620 may include parsing the response to extract a summary description and a metric indicating a confidence that the summary description is accurate. The processing may further include checking the summary description against a dictionary of vocabulary (e.g. proper nouns), phonetic mappings, and prohibited phrases that are relevant to the type of source content. For example, the engine 620 can modify the received and extracted summary description to ensure the summary description includes names of characters rather than names of actors who portray a character within the content segment.

In act 1010, the engine 620 stores the summary description, produced by the LLM 622, as a summary description 624 for subsequent processing.

In act 1012, the engine 620 determines if the currently selected and now processed content segment is the last content segment of the segment descriptions 612. If the currently selected content segment is the last content segment, then the process 1000 may end. If the currently selected content segment is not the last content segment, then the process 1000 proceeds to act 1014.

In the act 1014, the engine 608 is configured to iterate to select a next, unprocessed group of segment summaries for processing.

Figure 11A:
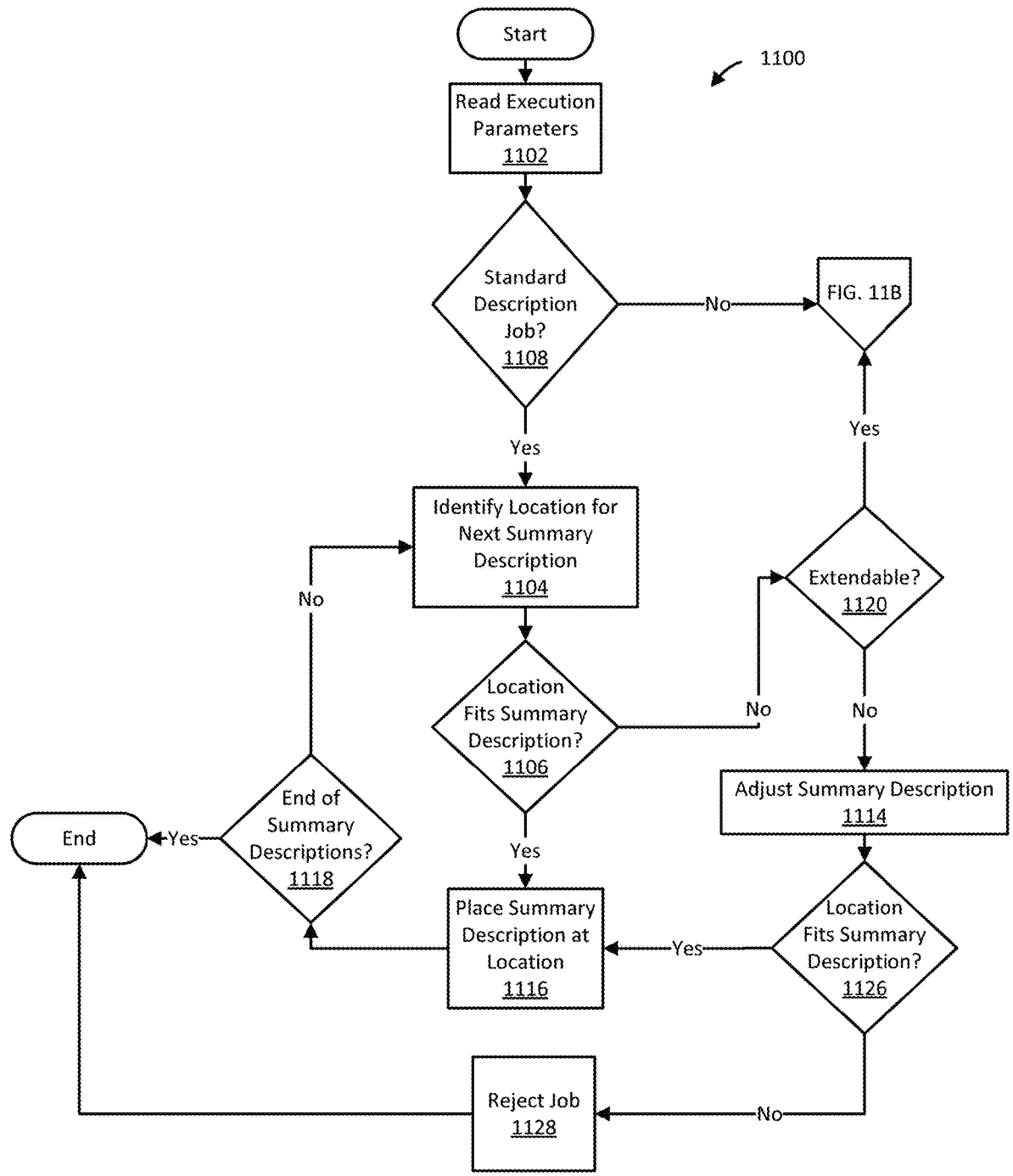
FIGS. 11A and 11B are a flow diagram illustrating a process of generating an audio description according to at least one embodiment described herein.
Figure 11B:
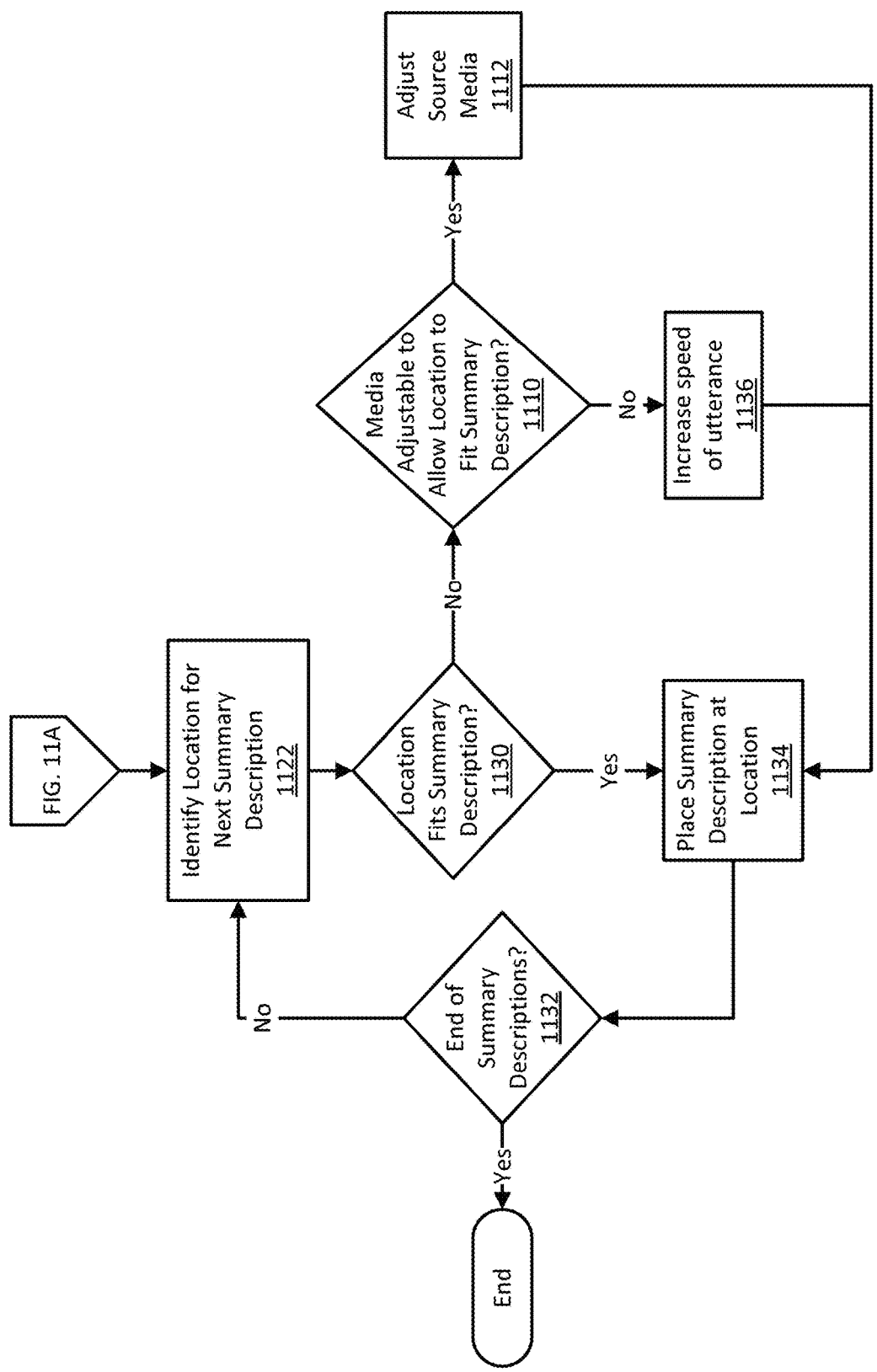

Returning to FIG. 6, in some embodiments, the engine 620 is configured to communicate, upon completion of the process 1000 of FIG. 10, a message indicating the availability of the summary descriptions 624 to the description placement engine 626. In some embodiments, the engine 626 is configured to place the summary descriptions (e.g., the summary descriptions 624 of FIG. 6) in locations identified by a segment description engine (e.g., the segment description engine 608 of FIG. 6). FIGS. 11A and 11B illustrate an example process 1100 that the engine 626 is configured to execute in some examples.

As shown in FIG. 11A, the process 1100 starts in act 1102 with the engine 626 reading execution parameters. The execution parameters include, in some examples, selections made in the controls 1502 of FIG. 15 for operations 1108, 1120, and 1110. For example, the controls 1502 present options for audio description type parameters to choose (e.g., standard or extended audio description). Extended audio description configures the engine 626 to modify the original media file audio, or to pause the playback of the original media file audio, to enable greater audibility for rendered audio description data.

In act 1108, the engine 626 determines whether the audio description parameters specified in the execution parameters indicate that the audio description job is a standard job. If the engine 626 determines that the audio description parameters indicate that the audio description job is a standard job, the engine 626 proceeds to act 1104. If the engine 626 determines that the audio description parameters indicate that the audio description job is not a standard job, the engine 626 proceeds to act 1122 of FIG. 11B.

In act 1104, the engine 626 chooses a respective location (e.g., gap) for a next, unprocessed summary description. The engine 626 can evaluate the locations and identify which location is the best suited for each summary description. In some embodiments, the engine 626 evaluates characteristics of each location, such as location duration, audio levels in the location, position of the location in relation to a segment associated with the summary description, etc. to determine a rating for how well a location is suited to contain the summary description. The engine 626 can weight these characteristics based on weights specified in the execution parameters. Further, in some examples, the engine 626 estimates a spoken duration for the summary description and compares the spoken duration with a duration of a location when identifying a placement location. A variety of processes may be used by engine 626 to estimate the spoken duration, including those described above in act 504 of FIG. 5. The engine 626 selects the location with the highest rating for placement of the summary description. In an alternative embodiment, the engine 626 identifies and selects a location having the largest duration that has the closest proximity to the segment associated with the summary description. In some examples, the engine 626 requires that locations be located within a configurable threshold value of a segment to be qualified to contain a summary description associated with the segment.

In act 1106, the engine 626 determines whether the summary description fits the location identified in the operation 1104. In some instances, even the best location for a summary description may be of a duration insufficient to render the entire summary description in a comprehendible manner. As such, in some examples, the engine 626 compares the estimated spoken duration with a duration of a targeted location to determine whether the location is of a sufficient duration. In some embodiments, in act 1106 if the engine 626 determines that the duration of the summary description fits a duration of a targeted location, then the process 1100 proceeds to act 1116. If the engine 626 determines that the duration of the summary description does not fit within the duration of the targeted location, then the process 1100 proceeds to act 1120.

In act 1116, the engine 626 places the summary description at the targeted location and synchronizes, within audio description transcription data 628, the beginning time index of the summary description with the beginning time index of the targeted location. In some examples, the targeted location may be referred to as a placement period.

In act 1120, the engine 626 determines whether the audio description parameters specified in the execution parameters indicate that the audio description job may be shifted to an extended job. If the engine 626 determines that the audio description parameters indicate that the audio description job may be shifted to an extended job, the engine 626 changes the job type to extended and proceeds to the act 1122 of FIG. 11B. If the engine 626 determines that the audio description parameters indicate that the audio description job may not be shifted to an extended job, the engine 626 proceeds to act 1114.

In act 1114 the engine 626 generates a message specifying a request for the description engine 1238 to generate a summary description and communicates the message to the engine 1238. This message may specify the requested source media as being the source media spanning the segment associated with the current summary description and a maximum summary length. In these examples, the engine 1238 receives the request and implements the architecture 600 of FIG. 6 to generate a new summary description but constrains the length of the candidate summaries generated by the ITT model 110 and the LLMs 610 of FIG. 1 to be less than or equal to the maximum summary length. Once the new summary description is generated, the engine 1238 returns it to the engine 626 in a response to the message, and the process 1100 continues.

In act 1126, the engine 626 determines whether the adjusted summary description fits the location identified in the operation 1104. In some examples, the engine 626 compares an estimated spoken duration of the adjusted summary description with a duration of the location to determine whether the location is of a sufficient duration. In some embodiments, in act 1126 if the engine 626 determines that the duration of the adjusted summary description fits a duration of a targeted location, then the process 1100 proceeds to act 1116. If the engine 626 determines that the duration of the adjusted summary description does not fit within the duration of the targeted location, then the process 1100 proceeds to act 1128.

In the act 1128, the engine 626 rejects the audio description job as the system is unable to complete the job given the parameters of the job and the content of the media file. Subsequent to rejection of the job, the process 1100 may end.

Alternatively or additionally, in some embodiments, rather than rejecting 1128 the job, the engine 626 searches for another location (e.g., gap) at which to place the summary description. For instance, in some examples, the engine 626 assesses all locations within a threshold proximity of the currently selected location for compatibility (e.g., sufficient duration) with the summary description, regardless of whether the location is already associated with another summary description. In these examples, if the engine 626 finds a compatible location that is associated with a summary description, the engine 626 arbitrates between the summary descriptions to identify one to place in the compatible location. This arbitration may consider description importance and or description proximity to its associated segment, among other factors. Further, in these examples, if the engine 626 finds a compatible location that is not associated with another summary description, the engine 626 places the summary description within the compatible location.

In act 1118, the engine 626 determines whether additional summary descriptions not yet processed by this instance of the process 1100 exist. If unprocessed summary descriptions exist, the engine 626 selects a next, unprocessed summary description to be the currently selected summary description and proceeds to the act 1104. If no unprocessed summary descriptions exist, the process 1100 may end.

Turning now to FIG. 11B, if the audio description job is an extended job, or was shifted to an extended job, the engine 626 enables extended audio description for summary descriptions that cannot be fit into an identified location within the source media. Extended audio description permits original audio modification (or original video pausing) and may allow audio description to proceed independently of the location times available as determined from the transcript or audio analysis. In at least one embodiment, any ordered audio descriptions that cannot be completed as standard audio description are automatically shifted to extended audio description. In this embodiment, audio description orders need not be canceled due to lack of sufficient locations.

In act 1122, the engine 626 chooses a respective location (e.g., gap) for a next, unprocessed summary description. The engine 626 can evaluate the locations and identify which location is the best suited for each summary description. In some embodiments, the engine 626 evaluates characteristics of each location, such as location duration, audio levels in the location, position of the location in relation to a segment associated with the summary description, etc. to determine a rating for how well a location is suited to contain the summary description. The engine 626 can weight these characteristics based on weights specified in the execution parameters. The engine 626 selects the location with the highest rating for placement of the summary description. In an alternative embodiment, the engine 626 identifies and selects a location having the largest duration that has the closest proximity to the segment associated with the summary description. In some examples, the engine 626 requires that locations be located within a configurable threshold value of a segment to be qualified to contain a summary description associated with the segment. Further, in some examples in which extended audio description has been selected, the engine 626 weights locations that include sentence boundaries and/or paragraph boundaries more over other locations.

In act 1130, the engine 626 determines whether the summary description fits the location identified in the operation 1122. In some instances, even the best location for a summary description may be of a duration insufficient to render the entire summary description in a comprehendible manner. As such, in some examples, the engine 626 compares the estimated spoken duration with a duration of a location to determine whether the location is of a sufficient duration. In some embodiments, in act 1130 if the engine 626 determines that the duration of the summary description fits a duration of a targeted location, then the process 1100 proceeds to act 1134. If the engine 626 determines that the duration of the summary description does not fit within the duration of the targeted location, then the process 1100 proceeds to act 1110.

In act 1134, the engine 626 places the summary description at the targeted location and synchronizes, within audio description transcription data 628, the beginning time index of the summary description with the beginning time index of the targeted location. In some examples, the targeted location may be referred to as a placement period.

In act 1110, the engine 626 determines whether the audio description parameters specified in the execution parameters indicate that the source media is adjustable to allow a location to fit a summary description. If the engine 626 determines that the audio description parameters indicate that the source media may be adjusted, the engine 626 proceeds to act 1112. If the engine 626 determines that the audio description parameters indicate that the source media cannot be adjusted, the engine 626 proceeds to act 1136.

In act 1136, the engine 626 varies the speaking rate used to audibly render the summary description. For example, the engine 626 may use a nominal speaking rate of 250 words/minute, but where this option is selected, the engine 626 is configured to selectively speed up the speaking rate in order to fit the summary description into shorter time periods than would be possible at a slower speaking rate. It is appreciated that any of these options may impact the automatic cancellation or shifting methods described herein. For example, setting a faster speaking rate, or enabling a variable speaking rate, may allow a lower duration threshold for locations. In some embodiments, the engine 626 can change the speed of utterance setting based on a duration of a selected location and the duration of a summary description. This is accomplished by measuring the speed of utterance (duration) of the summary description and comparing it to the duration of the corresponding location. The difference between the durations will dictate how much faster the speed of utterance the summary description must be to fit the duration of the location. Alternatively or additionally, in some examples, the engine 626 changes the summary description (e.g., replacing words in the summary description with shorter synonyms) until the speed of utterance of the new summary description is less than the duration of the location. When the audio description data is modified then the process moves to act 1134.

In act 1112, the engine 626 executes signal processing methods to, for example, decrease the amplitude of the original media file audio signal, or filter the signal, as described below, within locations. Even when there are locations in a media file sufficient for audio description, there can often be loud background music or other sounds that make simply mixing additional audio (e.g., by adding the digital samples from multiple audio files) problematic. It is common practice in many types of media to maximize the volume of these sections such that there is very little "headroom," which refers to how much additional volume can be inserted before reaching the maximum levels of the digital medium. In these cases, simply superimposing an audio description track on the original audio could result in undesirable clipping (e.g., exceeding the per-sample resolution of the digital waveform encoder). Even if there is sufficient headroom, the audio description track might be difficult to make out and understand when played simultaneously with these competing sounds and music. Thus, in some embodiments, the engine 626 modifies the original audio data of the source media to allow the summary description to be intelligible and to be played without distortion. The modification can be accomplished via a variety of methods, including those described above with reference to act 512 of FIG. 5.

Alternatively or additionally, in the act 1112 the engine 626 may pause the video or output instructions for a compatible player to pause the video so that audio descriptions may be inserted in a way that does not overlap with the original media file audio. Thus, the engine 626 effectively extends the duration of the original media file by inserting replicated image frames into the original video data and inserting silence into the original audio data, both for a duration equal to the duration of the summary description positioned at that point of the media file.

Alternatively or additionally, in the act 1112, the engine 626 generates instructions to be included in audio description output files to adjust playback of the original media file. These instructions may include, for example, commands for a player (e.g., a player included in the customer interface 1224 and downloaded to the client computer 1204 of FIG. 12) to pause the video at the given point, for a given duration, and to play back the descriptive audio during the pause. Thus, in these examples, the audio description output files include the instructions, combined with descriptive audio snippets. The instructions point to which snippet is to be played at which location in the time index of the media file, and specify for how long the original media file is to be paused. In some examples, descriptive audio snippets are replaced with text of audio description that is to be audibly rendered (e.g. by a screen/text reader or other client-side synthesis control interoperating with or integrated within the player) at a specified location (e.g., a timestamp) in the original audio. In these examples, the instructions cause the player to pause the original audio at the specified location, send commands to the client-side synthesis control to synthesize and return audio corresponding to the text, play back the synthesized audio, and then resume playing the original audio.

In act 1132, the engine 626 determines whether additional summary descriptions not yet processed by this instance of the process 1100 exist. If unprocessed summary descriptions exist, the engine 626 selects a next, unprocessed summary description to be the currently selected summary description and proceeds to the act 1122. If no unprocessed summary descriptions exist, the process 1100 may end.

It should be noted that the audio description system 1200 can be configured to execute any of the processes that the audio description system 100 described in the Audio Description patent is configured to execute. In addition, certain features of the audio description system 100 described in the Audio Description patent are enhanced within the audio description system 1200 as described herein.

For instance, in some embodiments, the market engine 1232 is configure to calculate a pay rate for an audio description job using the method described in the Audio Description patent and to adjust the pay rate further based on one or more of the following factors: a number (and/or rate per unit time) of automatically generated descriptions proposed; a number of words or characters (and/or rate per unit time) in the proposed descriptions; an implied duration (and/or percentage of total duration) of the proposed descriptions, for example, calculated using a scale factor on word-count, character-count, or syllable count, or measured from synthetic speech produced from these descriptions; and/or confidence values returned by the ITT models and/or the NLP models used in the pruning phase.

In another embodiment, the market engine 1232 is configured to interoperate with a generative AI model, trained and/or fine-tuned using already completed jobs, to predict the human level of effort (e.g., in hours) required to complete an audio description job. This estimate can be multiplied by a target hourly rate to arrive at a pay rate for the audio description job. In some examples, the market engine 1232 is configured to train and/or fine-tune the generative AI model using audio description jobs previously completed by describers. In these examples, the training data may be assembled using a methodology similar to the methodology described above used to assemble training data exemplifying high quality examples of audio description.

Figure 13:
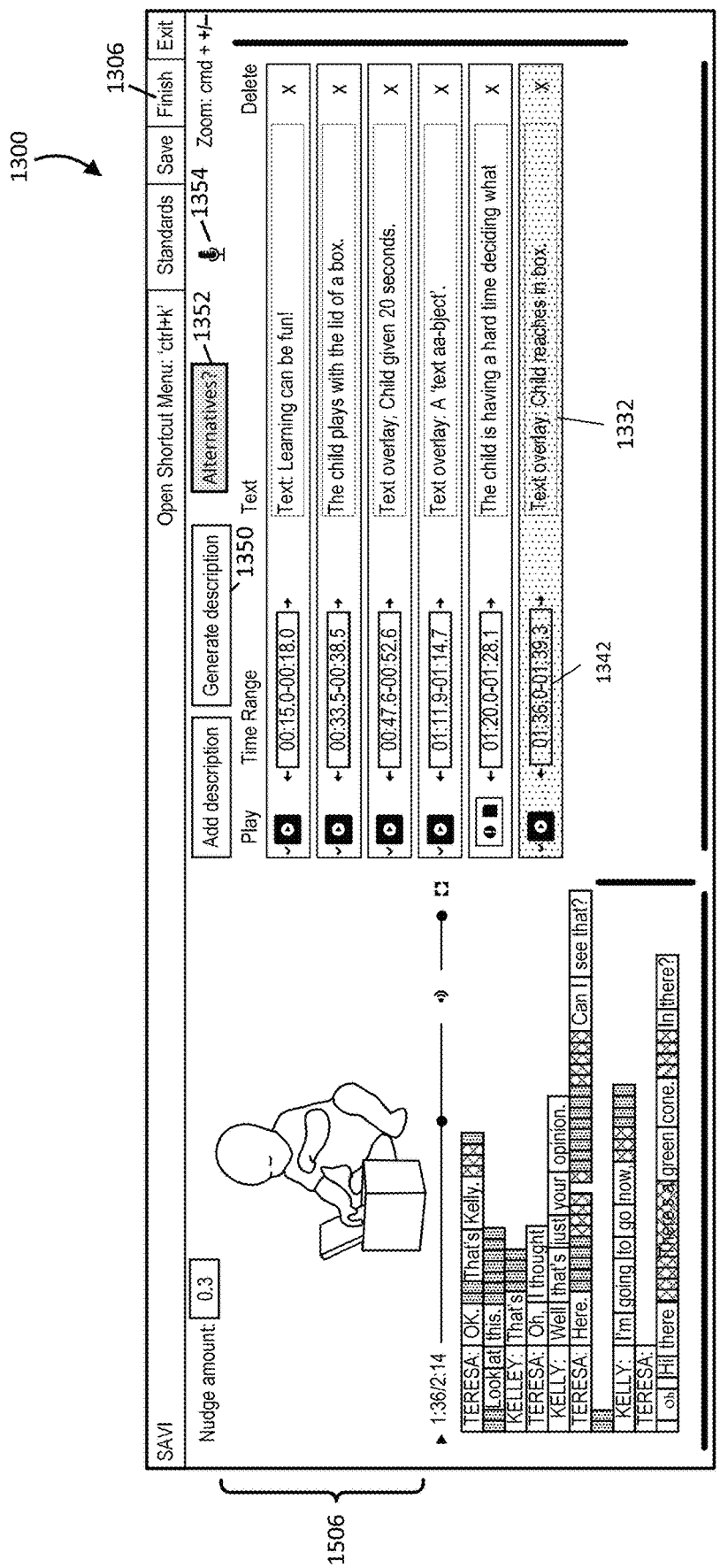
FIG. 13 is a front view of an example describing screen according to at least one embodiment described herein.

As described above, some embodiments include tools for on-demand generation and modification of audio description text used by human editors. Selected features of such tools are described further below with reference to FIGS. 13, 14, 17, and 18. For instance, FIG. 13 illustrates an example of a describing screen 1300 rendered by execution of code included in the describer interface 1240 in some embodiments. As shown, the screen 1300 includes many of the features of the Synthesized Audio Video Interface (SAVI) 1500 described with reference to FIG. 15 of the Audio Description patent, such as the video control 1506. In addition, the screen 1300 includes a generate button 1350, an alternatives button 1352, a microphone button 1354, and a finish control 1306 with incorporates the features of the finish control illustrated in FIG. 15 of the Audio Description patent.

In some embodiments, the SAVI 1300 is configured to recognize and respond to input selecting the generate button 1350 by generating and communicating a message to the description engine 1238. This message may specify a request to automatically generate audio description for a time range specified in a selected time control, such as the control 1342. The engine 1238 may be configured to receive and parse the message, extract the request, process the request via any of the architectures described herein, generate a response specifying the requested audio description data, and communicate the response to the SAVI 1300. The SAVI 1300, in turn, may be configured to receive and parse the message, extract the requested audio description data, and display text representative of the audio description data in a text box associated with the selected time control, such as the text box 1332.

In some embodiments, the SAVI 1300 is configured to recognize and respond to input selecting the alternatives button 1352 by prompting a generative AI model (e.g., the model 110 of FIG. 1) to provide alternative phrases with the same semantics as text within a selected text box 1332 and to present the alternative phrases (e.g., via a modal dialog) to the user for selection. The presentation of the alternative phrases may be accompanied by estimated spoken durations for the alternative phrases using the estimation techniques described herein. The SAVI 1300 is configured to recognize and respond to input selecting the microphone button 1354 by receiving and automatically transcribing words spoken by a user into text and storing the text in a selected text box 1332 for subsequent processing as an audio description.

Figure 14:
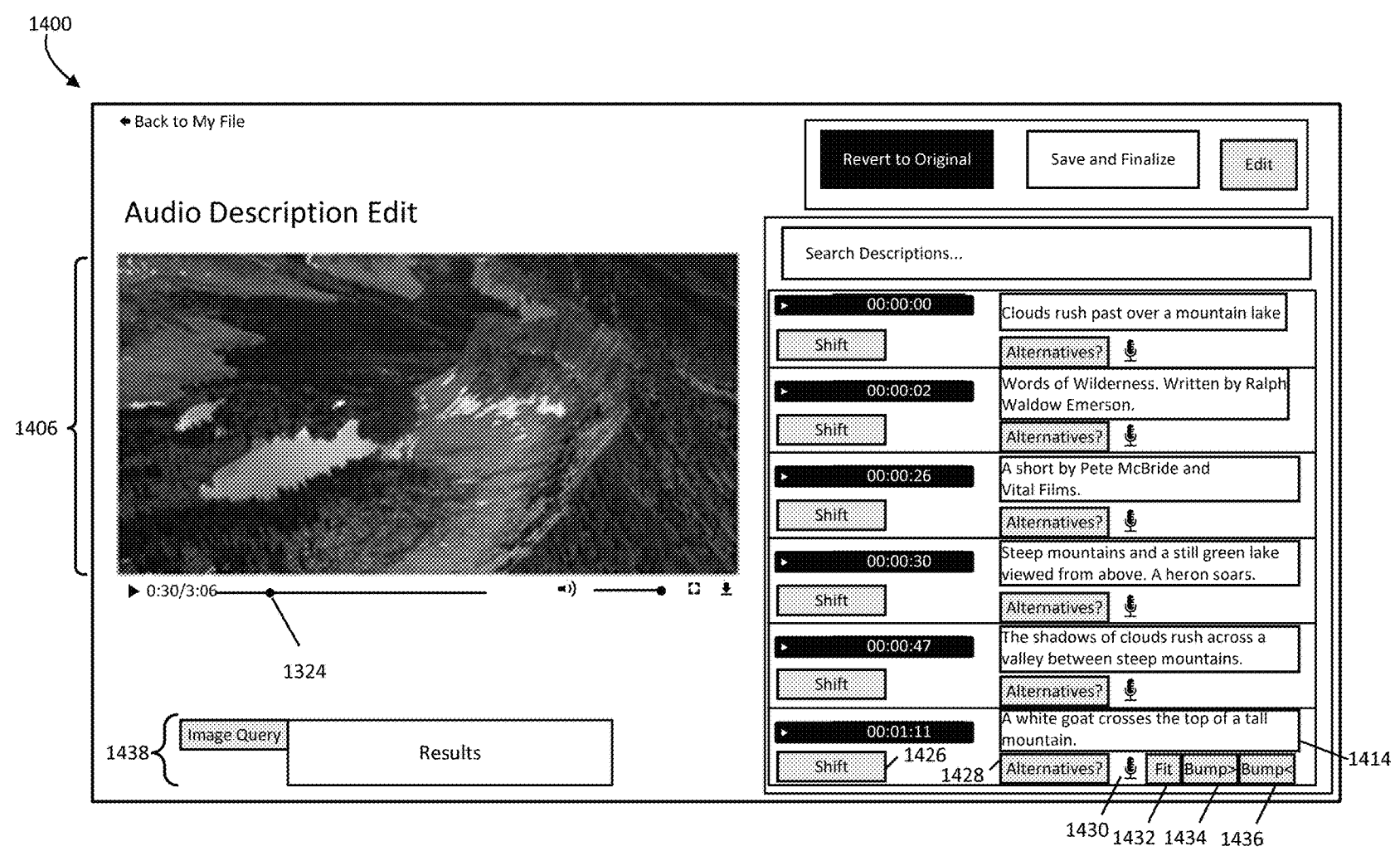

Turning now to FIG. 14, a customer editing screen 1400 that is an enhanced version of the customer editing screen 1600 described in the Audio Description patent, is shown. Additional features of the screen 1400 described herein include an alternatives button 1428, a microphone control 1430, a fit button 1432, a bump longer button 1434, a bump shorter button 1436, a shift button 1426, and an image query control group 1438.

In some embodiments, the customer editing interface 1400 is configured to recognize and respond to input selecting the alternatives button 1428 by prompting a generative AI model (e.g., the model 110 of FIG. 1) to provide alternative phrases with the same semantics as text within a selected text box 1414 and to present the alternative phrases (e.g., via a modal dialog) to the user for selection. The presentation of the alternative phrases may be accompanied by estimated spoken durations for the alternative phrases using the estimation techniques described herein. The interface 1400 is configured to recognize and respond to input selecting the microphone control 1430 by receiving and automatically transcribing words spoken by a user into text and storing the text in a selected text box 1414 for subsequent processing as an audio description. The interface 1400 is configured to recognize and respond to input selecting the fit button 1432 by prompting a generative AI model to provide alternative phrases with the same semantics as text within a selected text box 1414 and to present the alternative phrases (e.g., via a modal dialog) to the user for selection. The presentation of the alternative phrases may be accompanied by estimated spoken durations for the alternative phrases using the estimation techniques described herein.

In some embodiments, the interface 1400 is configured to recognize and respond to input selecting the bump button 1434 by prompting a generative AI model to provide alternative phrases with the same semantics as text within a selected text box 1414 but with a slightly longer (e.g., 1 second) duration. One such example prompt could be "Rephrase the sentence following this prompt to be longer. Specifically, we want the result to have a read time, using a typical speech rate of 150 words per minute, of an additional 3 seconds." The interface 1400 is configured to recognize and respond to input selecting the bump button 1436 by prompting a generative AI model to provide alternative phrases with the same semantics as text within a selected text box 1414 but with a slightly shorter (e.g., 1 second) duration, using prompts similar to those described above for the "bump longer" function. The interface 1400 is configured to recognize and respond to input selecting the shift button 1426 by prompting the user for an amount of time by which to move the audio description on the time index of the source media.

In some embodiments, the interface 1400 is configured to recognize and respond to input selecting the query button within the control group 1438 by extracting an image being presented within the video display 1406 executing one or more query operations using the image. The one or more query operations may include prompting a generative AI to describe the image and/or prompting a generative AI to identify the image if the image is well-known (e.g., a work of art). The one or more query operations may include using a description of the image returned by the generative AI to execute an internet search engine query, submitting the image directly to an image search engine, and/or executing OCR on the image. Regardless of the query operation performed, in some embodiments, the interface 1400 is configured to display results of the query operation within the results box of the control group 1438.

Figure 15:
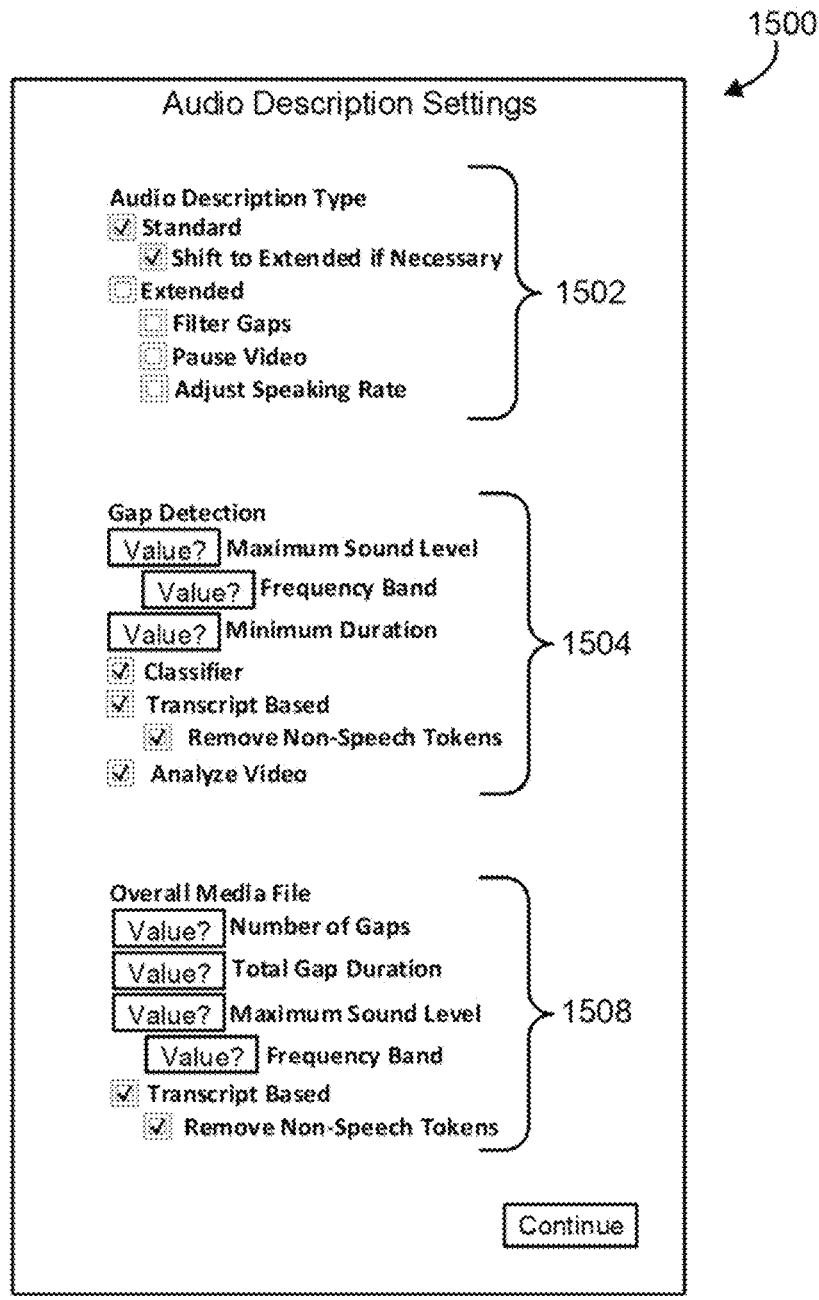
FIG. 15 is a front view of another example configuration screen according to at least one embodiment described herein.

In some examples, the customer interface 1224 is configured to provide other configuration screens to enable a customer to configure other audio description settings. FIG. 15 illustrates a configuration screen 1500 provided by some of these examples. As shown, the configuration screen 1500 includes controls 1502 configured to receive selections of audio description type, controls 1504 configured to receive values of tunable parameters of the description engine 1238 directed to location identification/detection, and controls 1508 configured to receive values of tunable parameters of the description engine 1238 directed to determining overall media file suitability for audio description. The controls 1502, 1504, and 1508 impact how and whether audio description may be applied to original media files.

The examples described above focus on a web-based implementation of the describer interface screens. However, embodiments are not limited to a web-based design. Other technologies, such as technologies employing a specialized, non-browser-based client, may be used without departing from the scope of the aspects and embodiments disclosed herein.

Each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data into the audio description system 1200 or unauthorized access to the audio description system 1200.

Embodiments of the audio description system 1200 are not limited to the particular configuration illustrated in FIG. 12. Various examples utilize a variety of hardware components, software components and combinations of hardware and software components configured to perform the processes and functions described herein. In some examples, the audio description system 1200 is implemented using a distributed computer system, such as the distributed computer system described further below with regard to FIG. 16.

As discussed above with regard to FIG. 12, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 16:
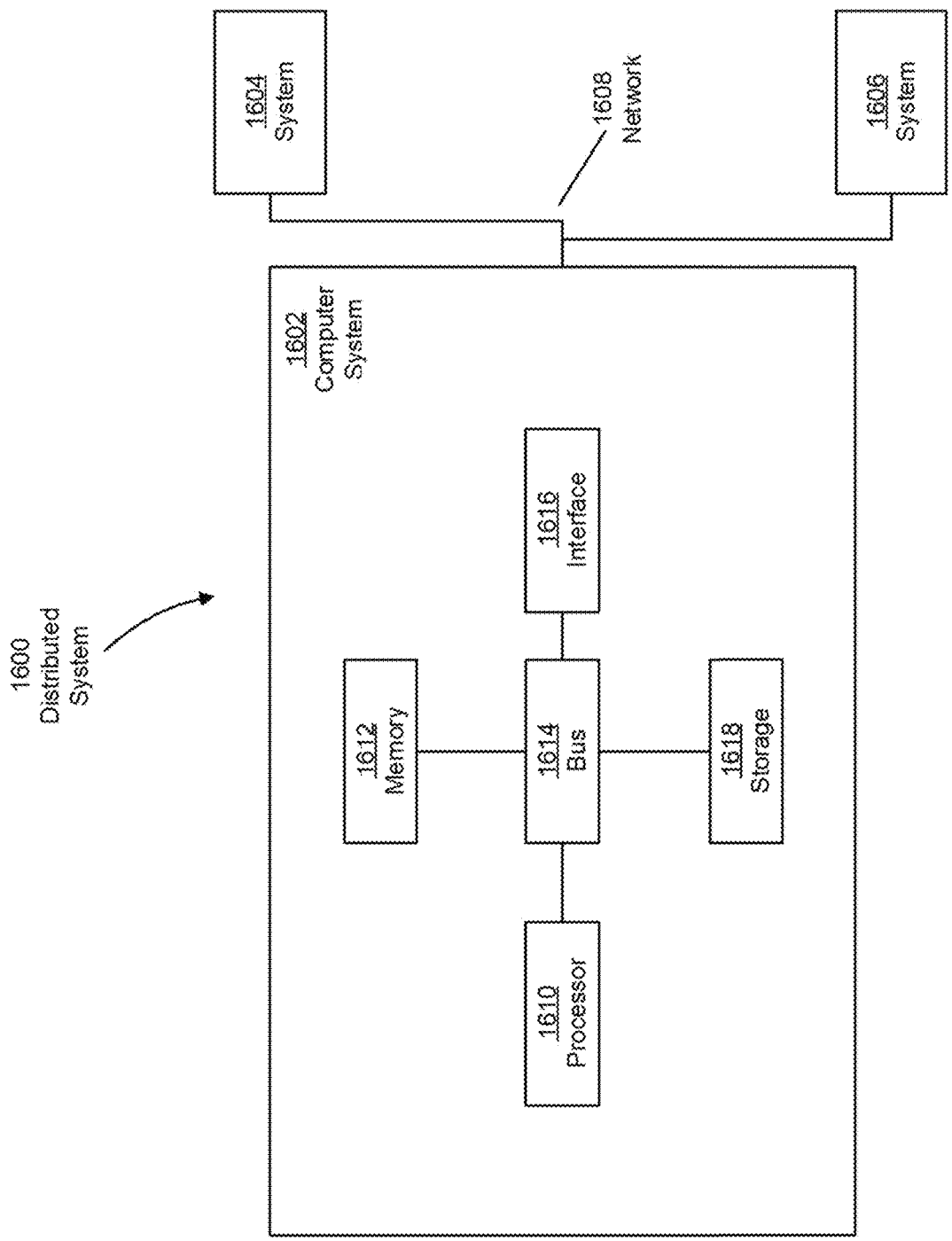
FIG. 16 is a schematic diagram of one example of a computer system that may perform processes and functions according to at least one embodiment described herein.

Referring to FIG. 16, there is illustrated a block diagram of a distributed computer system 1600, in which various aspects and functions are practiced. As shown, the distributed computer system 1600 includes one more computer systems that exchange information. More specifically, the distributed computer system 1600 includes computer systems 1602, 1604 and 1606. As shown, the computer systems 1602, 1604 and 1606 are interconnected by, and may exchange data through, a communication network 1608. The network 1608 may include any communication network through which computer systems may exchange data. To exchange data using the network 1608, the computer systems 1602, 1604 and 1606 and the network 1608 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 1602, 1604 and 1606 may transmit data via the network 1608 using a variety of security measures including, for example, TLS, SSL or VPN. While the distributed computer system 1600 illustrates three networked computer systems, the distributed computer system 1600 is not so limited and may include any number of computer systems and computing devices, networked using any medium and communication protocol.

As illustrated in FIG. 16, the computer system 1602 includes a processor 1610, a memory 1612, a bus 1614, an interface 1616 and data storage 1618. To implement at least some of the aspects, functions and processes disclosed herein, the processor 1610 performs a series of instructions that result in manipulated data. The processor 1610 may be any type of processor, multiprocessor or controller. Some example processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 1610 is connected to other system components, including one or more memory devices 1612, by the bus 1614.

The memory 1612 stores programs and data during operation of the computer system 1602. Thus, the memory 1612 may be a relatively high performance, volatile, random access memory such as a dynamic random access memory (DRAM) or static memory (SRAM). However, the memory 1612 may include any device for storing data, such as a disk drive or other non-volatile storage device. Various examples may organize the memory 1612 into particularized and, in some cases, unique structures to perform the functions disclosed herein. These data structures may be sized and organized to store values for particular data and types of data.

Components of the computer system 1602 are coupled by an interconnection element such as the bus 1614. The bus 1614 may include one or more physical busses, for example, busses between components that are integrated within a same machine, but may include any communication coupling between system elements including specialized or standard computing bus technologies such as IDE, SCSI, PCI and InfiniBand. The bus 1614 enables communications, such as data and instructions, to be exchanged between system components of the computer system 1602.

The computer system 1602 also includes one or more interface devices 1616 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 1602 to exchange information and to communicate with external entities, such as users and other systems.

The data storage 1618 includes a computer readable and writeable nonvolatile, or non-transitory, data storage medium in which instructions are stored that define a program or other object that is executed by the processor 1610. The data storage 1618 also may include information that is recorded, on or in, the medium, and that is processed by the processor 1610 during execution of the program. More specifically, the information may be stored in one or more data structures specifically configured to conserve storage space or increase data exchange performance. The instructions may be persistently stored as encoded signals, and the instructions may cause the processor 1610 to perform any of the functions described herein. The medium may, for example, be optical disk, magnetic disk or flash memory, among others. In operation, the processor 1610 or some other controller causes data to be read from the nonvolatile recording medium into another memory, such as the memory 1612, that allows for faster access to the information by the processor 1610 than does the storage medium included in the data storage 1618. The memory may be located in the data storage 1618 or in the memory 1612, however, the processor 1610 manipulates the data within the memory, and then copies the data to the storage medium associated with the data storage 1618 after processing is completed. A variety of components may manage data movement between the storage medium and other memory elements and examples are not limited to particular data management components. Further, examples are not limited to a particular memory system or data storage system.

Although the computer system 1602 is shown by way of example as one type of computer system upon which various aspects and functions may be practiced, aspects and functions are not limited to being implemented on the computer system 1602 as shown in FIG. 3. Various aspects and functions may be practiced on one or more computers having different architectures or components than that shown in FIG. 3. For instance, the computer system 1602 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 1602 may be a computer system including an operating system that manages at least a portion of the hardware elements included in the computer system 1602. In some examples, a processor or controller, such as the processor 1610, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 1610 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C#(C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a proprietary data structure (such as a database or file defined by a user mode application) or in a commonly shared data structure (such as an application registry that is defined by an operating system). In addition, some examples provide for both system and user interfaces that allow external entities to modify the parameters and thereby configure the behavior of the components.

Figure 17:
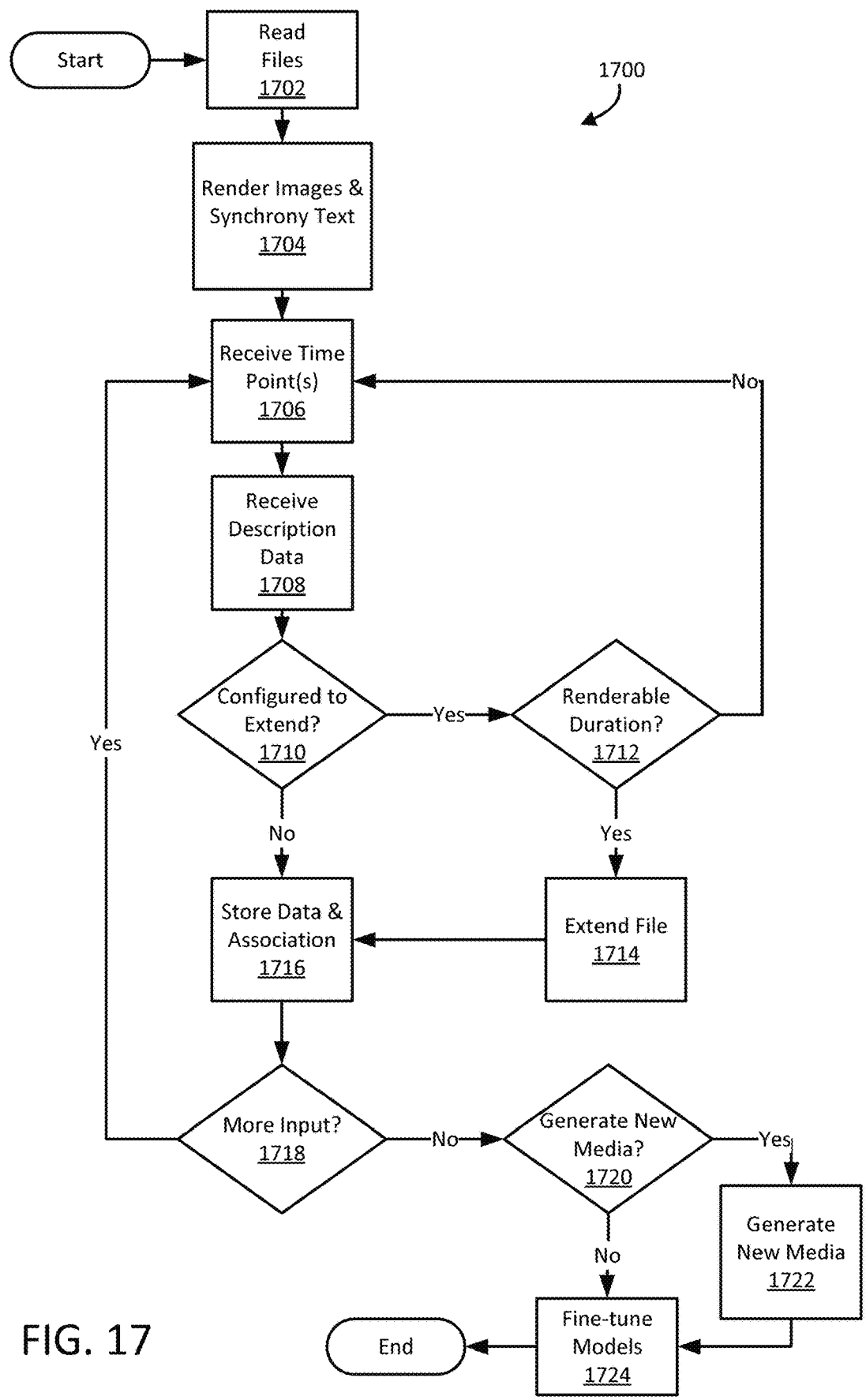
FIG. 17 is a flow diagram illustrating an audio description process according to at least one embodiment described herein.
Figure 18:
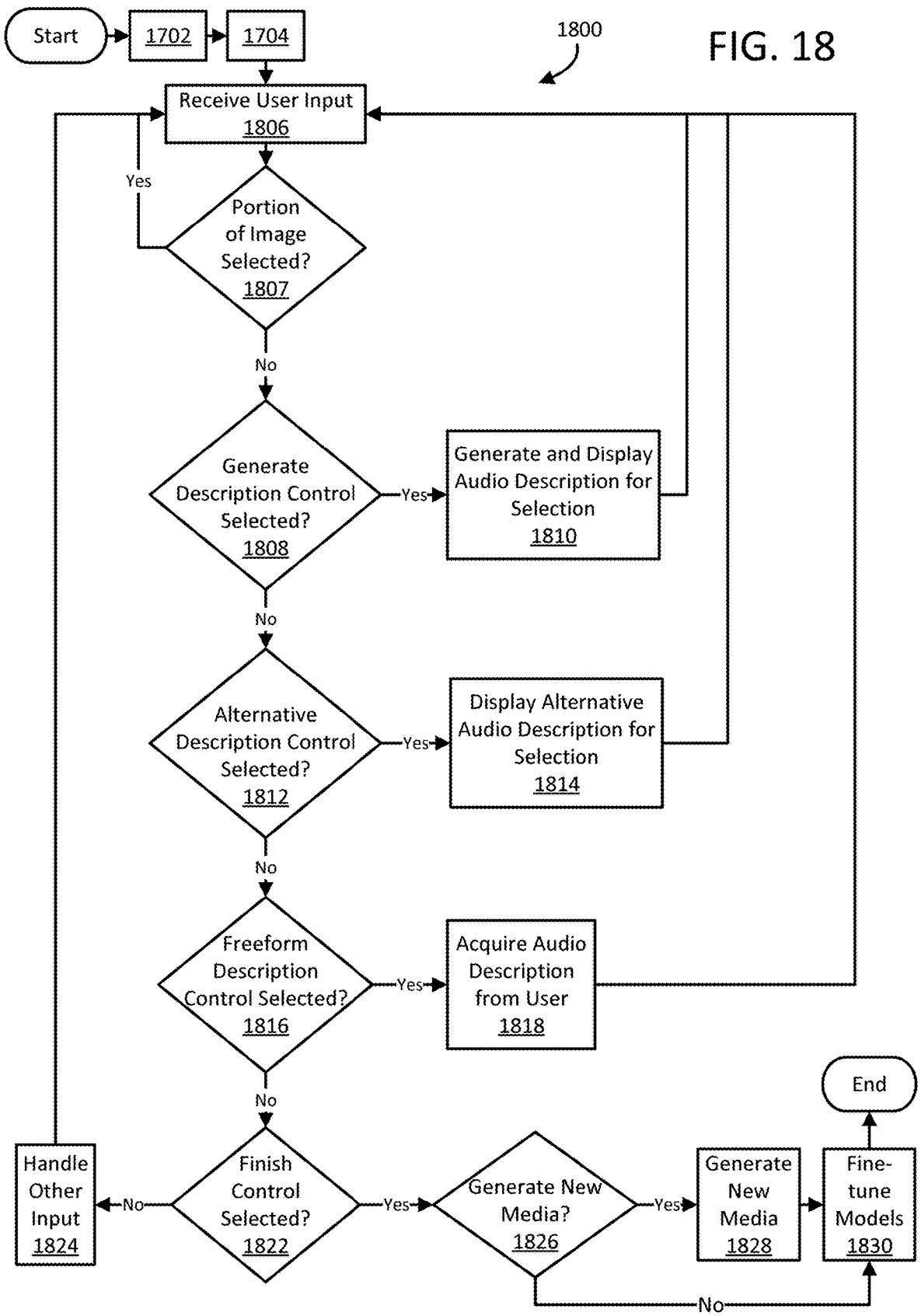
FIG. 18 is a flow diagram illustrating another audio description process according to at least one embodiment described herein.

In some embodiments, human editors have the ability to augment the performance of the invoked AI system using a variety of interactions, such as manually selecting points within a time index to insert audio description and/or manually selecting a subset of a video image frame (i.e., a "crop") for description generation. FIGS. 17 and 18 illustrate some processes that are executed within these embodiments.

Turning to FIG. 17, a process 1700 is illustrated in which a computer system, such as the audio description system 1200 described above with reference to FIG. 12, interacts with a user to generate on-demand audio description. According to this example, the process 1700 includes acts of reading a media file and a transcript, rendering one or more images, rendering transcription text, receiving at least one time point, receiving audio description data, storing and associating the audio description data with at least one time point, extending the media file, and generating a new media file.

In act 1702 a user interface (e.g., the describer interface 1240 of FIG. 12) reads files stored in memory (e.g. within the media file data store 1236 of FIG. 12). These files may include a media file comprising video data accessible via a time index and audio data synchronized with the video data via the time index. The files may also include a transcript of the audio data comprising time-coded text.

Next, in act 1704, the user interface renders, via a display, a screen (e.g., the screens 1300 and/or 1400 described above with reference to FIGS. 13 and 14). The screen may include controls that render one or more images from portions of the video data, along with text from portions of the transcription data and/or automatically generated audio description data (if such as been previously generated) in synchrony with the one or more images. The user interface may be further configured to render (e.g., via the screen) additional text from additional portions of the transcription data adjacent to the portions of the transcription data. Additionally, the user interface may be further configured to identify a plurality of points within the time index that identify a plurality of portions of the audio data that each have one or more attributes that meet one or more predefined criteria. The user interface may be further configured to render, via the screen, a plurality of indications representing the plurality of points within the text and the additional text. The one or more attributes may comprise a duration, a volume, and/or a volume over a range of frequencies. The one or more predefined criteria may specify that the duration be at least a predefined threshold value, the volume not exceed a predefined threshold value, and/or the volume over the range of frequencies not transgress one or more predefined threshold values. Furthermore, in some examples, the user interface may be configured to identify the plurality of points at least in part by accessing one or more of the transcription data and the audio data.

In act 1706, the user interface receives input identifying at least one point within the time index. The user interface may be configured to receive input identifying the at least one point via selection of an area within the text.

In act 1708, the user interface receives input specifying audio description data to associate with the at least one point. The user interface may receive this data, for example, via a microphone. Alternatively, or additionally, the user interface may receive the data via a keyboard.

In act 1710, the computer system determines if the processor is configured to extend the media file. If not, the computer system executes act 1716. If so, the computer system determines whether the audio description data has at least one renderable duration in act 1712. If not, the computer system returns to, and executes, act 1706. Otherwise, the computer system executes act 1714.

In act 1714, the computer system extends the media file, at one or more locations accessible via the at least one point, by the at least one renderable duration.

In act 1716, the computer system stores, in the memory, the audio description data and an association between the audio description data and the at least one point.

Next, in act 1718, the computer system determines if more input is available to receive. If so, the computer system returns to, and executes, act 1706. If not, the computer system determines whether the processor is configured to generate a new media file in act 1720. If not, process 1700 proceeds to act 1724. Otherwise, the computer system executes act 1722.

In act 1722, the computer system generates a new media file. The new media file may include the audio description data synchronized with the video data according to the time index. Alternatively, or additionally, the new media file may include the video data, the audio data, and the audio description data. In another alternative or addition, if the processor is further configured to adjust a volume of at least one portion of the audio data, thereby generating adjusted audio data, the computer system generates a new media file that comprises the adjusted audio data.

In act 1724, the computer system uses the new media file to fine tune the ITT and LLM models, and the process ends. It should be noted that the training activity executed in the act 1724 may be used to create domain-specific models, e.g. news & broadcast, education/lecture, film & media, etc., in some embodiments.

Another example of a process that generates an audio description of a media file using a computer system (e.g., the audio description system 1200 of FIG. 12) is illustrated in FIG. 18. The process 1800 includes various acts described below.

As shown in FIG. 18, the process 1800 starts with the computer system executing acts 1702 and 1704 described above with reference to FIG. 17. Next, in act 1806, the computer system receives user input.

In act 1807, the computer system determines whether the user input selected image data displayed within the user interface (e.g., an image frame, or a portion thereof (e.g., a crop), displayed in the video control 1506 of FIG. 13). If the computer system determines that image data was selected, the computer system proceeds to act 1810. If the computer system determines that image data was not selected, the computer system proceeds to act 1808.

In act 1808, the computer system determines whether the user input selected a generate control (e.g., the generate button 1350 of FIG. 13). If the computer system determines that the generate control was selected, the computer system proceeds to act 1810. If the computer system determines that the generate control was not selected, the computer system proceeds to act 1812.

In the act 1810, the computer system generates and displays audio description data for the current selection (e.g., at least one time point selected via acts 1824 and/or image data selected via act 1807). Within the act 1810, the audio description data may be generated using any of the architecture and processes described herein. As such the audio description data may be placed at a time point coincident with selected image data, may be placed at another time point via the autonomous placement processes described herein, or may be placed at another time in response to user input. The computer system associates the generated audio description data with at least one point.

In the act 1812, the computer system determines whether the user input selected an alternative control (e.g., the alternative button 1352 of FIG. 13). If the computer system determines that the alternative control was selected, the computer system proceeds to act 1814. If the computer system determines that the alternative control was not selected, the computer system proceeds to act 1816.

In the act 1814, the computer system generates and displays alternative audio description for the current selection (e.g., at least one time point selected via acts 1824 and/or image data selected via acts 1807). Within the act 1814, the alternative audio description data may be generated using any of the architecture and processes described herein. The computer system associates the generated alternative audio description data with at least one point.

In the act 1816, the computer system determines whether the user input selected a freeform control (e.g., the microphone button 1354 of FIG. 13). If the computer system determines that the freeform control was selected, the computer system proceeds to act 1818. If the computer system determines that the freeform control was not selected, the computer system proceeds to act 1822.

In the act 1818, the computer system receives input specifying audio description data to associate with at least one point. The interface device coupled to the at least one processor may be a microphone, wherein the at least one processor is configured to receive input specifying the audio description data via the microphone. Alternatively, or additionally, the interface device coupled to the at least one processor may be a keyboard, wherein the at least one processor is configured to receive input specifying the audio description data via the keyboard. In some examples, the input specifying the audio description data acquired in the act 1818 is passed to an audio description engine (e.g., the audio description engine 1238) to be used as the basis for automatically generated audio description data. In these examples, the computer system provides the automatically generated audio description data to the user for approval prior to associating it with the at least one point.

In the act 1822, the computer system determines whether the user input selected a finish control (e.g., the finish control 1306 in FIG. 13). If the computer system determines that the finish control was selected, the computer system proceeds to act 1826. If the computer system determines that the finish control was not selected, the computer system proceeds to act 1824.

In the act 1824, the computer system executes operations to handle the input, such as the acts 1706-1718 described above with reference to FIG. 17.

In the act 1826, the computer system determines whether the computer system has been configured to generate a new media file. If not, process 1800 proceeds to act 1830. Otherwise, the computer system executes act 1828.

In act 1828, the computer system generates a new media file. The new media file may include the audio description data synchronized with the video data according to the time index. Alternatively, or additionally, the new media file may include the video data, the audio data, and the audio description data. In another alternative or addition, if the processor is further configured to adjust a volume of at least one portion of the audio data, thereby generating adjusted audio data, the computer system generates a new media file that comprises the adjusted audio data.

In act 1830, the computer system uses the new media file to fine tune the ITT and LLM models, and the process ends. It should be noted that the training activity executed in the act 1824 may be used to create domain-specific models, e.g. news & broadcast, education/lecture, film & media, etc., in some embodiments.

In some examples, the training and fine-tuning operations described herein (e.g., operations 1724 of FIGS. 17 and 1830 of FIG. 18), utilize a corpus of labeled training data that includes audio descriptions generated by describers when completing audio description jobs. In these examples, the finalized descriptions are associated with individual frames, segments of a media file, and/or clusters of a media file, which may be generated as described herein. The training operations employed may include a pass of reinforcement learning (RLHF) that uses especially appropriate pairings of images and descriptions as supplemental training data. These pairings may be identified via completion, by human experts, of audio description selection jobs.

Such jobs may be presented on the job market to particular describers (e.g., highly rated/qualified QA professionals) and may ask the describer to select and/or rate (e.g., on a scale of 1-5) one or more audio description jobs completed by other professionals. Utilization of this curated training data within a RLHF pass may further enhance the capability of the models discussed herein to generate high quality audio descriptions.

The illustrations of the processes herein each depict one particular sequence of acts in a particular example. The acts included in these processes may be performed by, or using, one or more computer systems specially configured as discussed herein. Some acts are optional and, as such, may be omitted in accord with one or more examples. Additionally, the order of acts can be altered, or other acts can be added, without departing from the scope of the systems and methods discussed herein. Furthermore, as discussed above, in at least one example, the acts are performed on a particular, specially configured machine, namely an audio description system configured according to the examples and embodiments disclosed herein.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

The invention claimed is:

1. An audio description system comprising:
   a memory storing source media comprising a plurality of frames positioned within the source media according to a time index; and
   at least one processor coupled with the memory, the at least one processor configured to:
      generate, using an image-to-text model, a textual description of each frame of the plurality of frames;
      identify a plurality of intervals within the time index, each interval of the plurality of intervals encompassing one or more positions of one or more frames of the plurality of frames;
      identify a plurality of placement periods within the time index, each placement period of the plurality of placement periods being temporally proximal to an interval of the plurality of intervals;
      generate a summary description based on at least one textual description of at least one frame positioned within a selected interval temporally proximal to a placement period of the plurality of placement periods; and
      associate the summary description with the placement period.

2. The audio description system of claim 1, wherein each interval of the plurality of intervals is defined by points on the time index associated with a cluster of textual descriptions or a segment of the source media.

3. The audio description system of claim 2, wherein the cluster of textual descriptions are associated with the points on the time index via frames described by the textual descriptions.

4. The audio description system of claim 1, wherein to identify the plurality of intervals comprises to identify locations in the source media using at least one modality.

5. The audio description system of claim 4, wherein to identify the plurality of placement periods comprises to identify locations in the source media using the at least one modality.

6. The audio description system of claim 5, wherein the at least one modality comprises one or more of an encoding data modality, an image data modality, an audio data modality, or a transcription data modality.

7. The audio description system of claim 1, wherein each interval of the plurality of intervals encompasses a temporally proximal set of frames depicting visually similar content that is dissimilar from content depicted in frames outside the interval.

8. The audio description system of claim 7, wherein textual descriptions of the set of frames depicting visually similar content share a common topic.

9. The audio description system of claim 7, wherein the temporally proximal set of frames are positioned within a span of the time index with a duration of between 5 seconds and 30 seconds.

10. The audio description system of claim 9, wherein a parameter specifying the duration is user configurable.

11. The audio description system of claim 1, wherein each placement period of the plurality of placement periods temporally proximal to an interval is positioned within 3 seconds of the interval according to the time index.

12. The audio description system of claim 1, wherein a parameter specifying temporal proximity is user configurable.

13. The audio description system of claim 1, wherein the at least one processor is further configured to:
   receive user input specifying an an adjustment to the placement period; and
   record the adjustment to the placement period, thereby repositioning the placement period relative to the interval.

14. The audio description system of claim 1, wherein to generate a summary description based on at least one textual description comprises to identify a textual description that is representative of a cluster of textual descriptions.

15. The audio description system of claim 1, wherein to generate a summary description based on at least one textual description comprises to prompt a large language model (LLM) to summarize a plurality of textual descriptions generated by the image-to-text model.

16. The audio description system of claim 1, wherein to generate a summary description based on at least one textual description comprises to prompt an LLM to summarize a plurality of textual descriptions generated by orchestrated interoperations between another LLM and the image-to-text model.

17. The audio description system of claim 1, wherein the at least one processor is further configured to generate audio description data based on an association between the summary description and the placement period.

18. A method comprising:
   generating, using an image-to-text model, a textual description of each frame of a plurality of frames positioned within source media by a time index;
   identifying a plurality of intervals within the time index, each interval of the plurality of intervals encompassing one or more positions of one or more frames of the plurality of frames;
   identifying a plurality of placement periods within the time index, each placement period of the plurality of placement periods being temporally proximal to an interval of the plurality of intervals;
   generating a summary description based on at least one textual description of at least one frame positioned within a selected interval temporally proximal to a placement period of the plurality of placement periods; and
   associating the summary description with the placement period.

19. The method of claim 18, wherein identifying the plurality of intervals comprises identifying locations in the source media using at least one modality.

20. The method of claim 19, wherein identifying the plurality of placement periods comprises identifying locations in the source media using the at least one modality.

21. The method of claim 20, wherein identifying locations in the source media using the at least one modality comprises identifying locations in the source media using one or more of an encoding data modality, an image data modality, an audio data modality, or a transcription data modality.

22. The method of claim 18, wherein identifying the plurality of intervals comprises identifying a segment of the source media.

23. The method of claim 18, wherein identifying the plurality of intervals comprises identifying a cluster of textual descriptions of a temporally proximal set of frames depicting visually similar content that is dissimilar from content depicted in frames outside set of frames.

24. The method of claim 18, wherein generating a summary description based on at least one textual description comprises identifying a textual description that is representative of a cluster of textual descriptions.

25. The method of claim 18, wherein generating a summary description based on at least one textual description comprises prompting a large language model (LLM) to summarize a plurality of textual descriptions generated by the image-to-text model.

26. The method of claim 18, wherein generating a summary description based on at least one textual description comprises prompting an LLM to summarize a plurality of textual descriptions generated by orchestrated interoperations between another LLM and the image-to-text model.

27. The method of claim 18, further comprising generating audio description data based on an association between the summary description and the placement period.

28. One or more non-transitory computer readable media storing sequences of instructions executable by a processor to autonomously generate audio description from source media, the sequences of instructions comprising instructions to:

generate, using an image-to-text model, a textual description of each frame of a plurality of frames positioned within the source media by a time index;

identify a plurality of intervals within the time index, each interval of the plurality of intervals encompassing one or more positions of one or more frames of the plurality of frames;

identify a plurality of placement periods within the time index, each placement period of the plurality of placement periods being temporally proximal to an interval of the plurality of intervals;

generate a summary description based on at least one textual description of at least one frame positioned within a selected interval temporally proximal to a placement period of the plurality of placement periods; and associate the summary description with the placement period.

29. The one or more non-transitory computer readable media of claim 28, wherein the instructions to identify the plurality of intervals comprise instructions to identify locations in the source media using at least one modality selected from an encoding data modality, an image data modality, an audio data modality, and a transcription data modality.

30. The one or more non-transitory computer readable media of claim 28, wherein the instructions to generate the textual description comprise instructions to generate a textual description of a portion of a frame of the plurality of frames.

\* \* \* \* \*